(12) United States Patent
Tsao et al.

(10) Patent No.: US 11,307,406 B2
(45) Date of Patent: Apr. 19, 2022

(54) CASCADED MIRROR ARRAY AND SCANNING SYSTEM THEREOF

(71) Applicant: NATIONAL TSING HUA UNIVERSITY, Hsinchu (TW)

(72) Inventors: Che-Chih Tsao, Hsinchu (TW); Chih-Hsiang Chen, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 211 days.

(21) Appl. No.: 16/670,088

(22) Filed: Oct. 31, 2019

(65) Prior Publication Data

US 2020/0132984 A1 Apr. 30, 2020

(30) Foreign Application Priority Data

Oct. 31, 2018 (TW) .................................. 107138562

(51) Int. Cl.
*G02B 26/08* (2006.01)
*G02B 26/10* (2006.01)

(52) U.S. Cl.
CPC ....... *G02B 26/101* (2013.01); *G02B 26/0816* (2013.01)

(58) Field of Classification Search
CPC . G02B 26/101; G02B 26/0816; G02B 26/105
USPC ....................................................... 359/201.2
See application file for complete search history.

(56) References Cited

U.S. PATENT DOCUMENTS

2004/0202407 A1* 10/2004 Hoke ..................... G02B 6/359
385/18

* cited by examiner

*Primary Examiner* — Euncha P Cherry
(74) *Attorney, Agent, or Firm* — Muncy, Geissler, Olds & Lowe, P.C.

(57) ABSTRACT

A Cascaded Mirror Array optical scanning system applies an array of reflectors, with each reflector (called array reflector for convenience) movable between discretized angular positions and independently switched by digitized electrical signals, to process a light beam by cascaded reflections to generate desired deflection angle of the beam. The precision of the discretized angular positions of each array reflector is maintained by a support structure, which supports the reflector while allowing it to rotate or tilt, and a set of positioning limiting structure, which limits the allowable angular position of the array reflector between a finite number of angular positions corresponding to the discretized angular positions.

12 Claims, 20 Drawing Sheets

CASCADED MIRROR ARRAY AND SCANNING SYSTEM THEREOF

CROSS-REFERENCE TO RELATED APPLICATION

This application claims the priority benefit of Taiwan Patent Application No. 107138562, filed on Oct. 31, 2018, in the Taiwan Intellectual Property Office, the disclosure of which is incorporated herein in its entirety by reference.

BACKGROUND OF THE INVENTION

1. Field of the Invention

The present invention relates to a light beam scanning system, more specifically, a precision light beam scanning system of simple construction, fast response, high impact resistance and low cost based on non MEMS fabrication processes.

2. Description of the Related Art

Vector scanning technology, also called point-to-point scanning or random-access scanning, has applications in vector graphics, laser marking, laser machining, laser additive manufacturing, LIDAR, and optical routing. Another emerging market is laser tracking/communication for UAVs (Unmanned Aerial Vehicles), automobiles, aircrafts and satellites, because the exponential rise of UAVs and increasing numbers of vehicles and satellites is creating overwhelming demand for data communication and straining radio frequency (RF) bandwidth capacity.

Galvano mirrors are the main commercial scanners and often used in industrial vector scanning. In a galvano mirror, a mirror is driven by a servo motor for fast and precise positioning. A galvano mirror has a wide scanning angle and can reach the scanning frequency of several kHz. An acousto-optic deflector is another type of scanner, which mainly uses the acousto-optic effect of special crystals to operate. This type of scanner can achieve an extremely high scanning frequency up to 100 MHz, but is confined to a small scanning angle. The acousto-optic deflector having an extremely high scanning frequency is suitable for material processing using a pulsed laser. However, these traditional scanners are quite expensive and huge, and not suitable for use in UAVs. Particularly, in a consideration of load and energy consumption, these traditional scanners are not suitable for small-sized UAVs.

On the other hand, microelectromechanical technology has potential in mass production of small and lightweight scanners at low cost, and the devices capable of performing vector scanning have also been commercialized. A microelectromechanical scanner typically includes a single mirror attached to a rotatable structure. However, in order to maintain precision, these devices still require complex circuits, built-in sensors, and driving control scheme for specific devices. Due to the complexity of the device structure, the manufacturing process and the need to use MEMS plants, a complete MEMS system including devices, driver electronics, and control software still costs a few thousand US dollars. (For examples, see product information of Mirrorcle Technologies, Inc. of Richmond, Calif., USA, company website and product brochure, http://mirror-cletech.com/pdf/MirrorcleTech_Device_Prices.pdf and of Sercalo Microtechnology Ltd., Switzerland, company website and product information, http://www.sercalo.com/product.php?idsubcat=9 #product-23)

Still another type of beam scanning approach under research applies cascaded stages of liquid crystal (LC) cell and prism pairs to achieve digital beam scanning. The switchable LC cell acts as a polarization switch to control the state of polarization of a light while a passive birefringent material prism is used to steer the beam into one of the two scanning destinations. By cascading several polarization switch-prism pairs, multiple scan angles can be obtained. For examples, see Khan S. A. and Riza N. A. (2004), "Demonstration of 3-dimensional wide angle laser beam scanner using liquid crystal," Opt. Express 12, 868, 2004 and McRuer et al. (1990), "Ferroelectric liquid-crystal digital scanner," Optics Letters, 15, 1415, both papers are incorporated herein in entirety by reference. This approach differs from the MEMS approaches in two ways. First, MEMS fabs are generally not needed so the manufacturing process can potentially be less complicated. Second, each stage is controlled digitally, i.e. having only two switchable states, so that control can be significantly simplified. However, precision prisms are still needed in each stage and they are not cheap to make. Another issue is that polarization switching efficiency and light transmission through a LC cell are both limited. Therefore, light beam quality after passing many stages of LC cells and prisms could deteriorate, especially in later stages corresponding to wide angle deflections.

A different liquid crystal beam scanner approach applies a so called liquid crystal clad waveguide. Light is introduced into and propagating along a thin waveguide core with one surface of the core cladded with a surface layer of voltage-controlled liquid crystal that can change the phase delay of the light propagating in the waveguide. By patterning an electrode into the shape of a prism in the plane of the waveguide, the controlled liquid crystal can effectively tune the refraction index of the prism and achieve the function of deflecting the direction of the passing light. See Davis et al. (2010), "Liquid crystal waveguides: new devices enabled by >1000 waves of optical phase control," Emerging Liquid Crystal Technologies V, ed. by Liang-Chy Chien, Proc. of SPIE Vol. 7618, 76180E-1. However, the limitation is that the light has to propagate within the thin, planar wave guide, which makes scanning in a perpendicular second direction difficult. To connect two devices for 2D scanning could also be difficult.

In addition, environmental and field operation issues are also important factors to consider. For example, moisture and temperature variations may have larger effect on liquid crystal devices than on mechanical devices. And noises from impact or external magnetic effect or statics could affect MEMS devices more than traditional scanners of heavier build.

Therefore, existing products or technologies still cannot quite satisfy the low-cost and light-weight requirements in commercial or consumer UAV applications. A low-cost, light weight scanner can have many new application areas. For example, multiple devices can be mounted onto a UAV, a car or in a robotic system for monitoring situations in different directions, not just for communications. This present invention provides a new digital scanning approach based on cascaded reflectors that can be made by simple, low-cost non-MEMS processes and has the potential of high speed, precision and light-weight.

SUMMARY OF THE INVENTION

In view of the above-mentioned conventional problems, an objective of the present invention is to provide a cascaded mirror array and a scanning system to solve the problem of inability to meet the requirements in low cost and light weight for applying in consumer products.

The basic principle of digital scanning by the Cascaded Mirror Array (CMA) is to apply an array of reflectors, with each reflector (called array reflector for convenience) movable between discretized angular positions and independently switched by digitized electrical signals, to process a light beam by cascaded reflections to generate desired deflection angle of the beam. The precision of the discretized angular positions of each array reflector is maintained by a support structure, which supports the reflector while allowing it to rotate or tilt, and a set of positioning limiting structure, which limits the allowable angular position of the array reflector between a finite number of angular positions corresponding to the discretized angular positions. The digitized switching electrical signal does not steer the reflector or conduct precision control. The signal merely deflects the reflector and the support and position limiting structure determine the discretized angular positions. In this way, the cost of electrical control can be minimized and the structures and precisions can be made and maintained by traditional manufacturing methods.

A light beam to be processed travels on a plane (the scan plane) through the CMA, passes by and is reflected by each of the reflector units in a sequential order. The overall deflection angle of the light beam on the plane by the CMA is the combined beam deflections at all the reflector units, provided that the discretized angular position changes of all the array reflectors are also on that plane. Because each array reflector can independently form a reflection angle, the combined deflections of all array reflectors can result in an overall beam deflection angle that is variable and adjustable within a set range.

Depending on the tilting angle of an individual reflector unit, two different constructions of deflection mechanism can be used to generate the required discretized, finite angular positions of the array reflector. For array reflectors of large tilting angles, a simple lever mechanism with a pivot that supports the array reflector and allows the array reflector to rotate or tilt about a fixed axis, e.g. mirror on a torsion beam or a pair of torsion hinges, with landing points of predetermined dimensions as position limiting structure can be applied. And electromagnetic driving similar to a MEMS galvano mirror can be used.

For small tilting angles of an individual reflector unit, a new type of micro-deflection mechanism, called Uneven-Leg Tilting (ULT) mechanism, is devised. The basic configuration of a ULT mechanism comprises 3 thin slab bar members and a base member jointed ends to ends to form a closed-loop. A top thin slab bar member is supported and jointed at two ends by two other thin slab bar members (called legs for convenience), which are attached to the two ends of the base member respectively, thereby forming a closed-loop structure. The two legs have a predetermined difference in length and are arranged basically in parallel to each other. Tilting the legs with respect to the base member results in slightly different rotation angles of the two legs, due to the length difference of the two legs, and the slightly different rotation angles of the two legs results in an even smaller rotation of the top member. By placing a mirror on top of the top member, a tilting of the ULT mechanism results in, in the transverse direction of the mirror's lateral displacement, a differential displacement between the two ends of the top member that rotates the mirror by a small angle.

The joints between the thin slab bar members and the base member can be hinge-like flexible joints. In this case, the ULT mechanism is in principle similar to a 4-bar linkage. Alternatively, the ULT mechanism can also apply a construction similar to a clamped-flat-spring type flexural bearing. That is, the 4 corners of the basic 4-member structure can be made rigid but the two legs are made flexural to facilitate lateral displacement and reflector tilting.

Both the simple lever deflection mechanism and the ULT mechanism can be made to generate two finite angular positions for each reflector unit by positioning two landing points at two ends of the mechanism or the mirror to restrict the deflection range of the mechanism. Therefore, each reflector unit can deflect a light bean at two finite deflection angles. When values of the finite rotational angle corresponding to different reflector units in a CMA device are arranged as a geometric progression with a common ratio of 2, then the combinations of all possible reflection angles by the reflector units can result in different overall beam scanning angles as an arithmetic progression.

The ULT mechanisms can use an electromagnetic actuation arrangement to provide magnetic fields across the legs by either permanent or electro magnets. An electric current can be passed through the loop of a ULT mechanism, in perpendicular directions relative to the directions of magnetic field, by entering from one leg and flowing out of the other, to induce a lateral force to tilt the mechanism. Reversing the current direction reverses the directions of the force and the tilting.

When a light beam travels through a CMA device on a plane, the CMA can be a 1D scanner that deflects and scans the light beam on the plane. 2D scanning can be achieved by adding into the internal beam reflection path of a 1D scanning CMA configuration a second set of reflector units with their finite angular position changes oriented to deflect the light beam off the plane.

The ULT mechanism can also be used in an analog, i.e. not digital, optical deflector, especially for small angle deflection. A mirror or a prism can be attached at the top of the top member to deflect a reflected or transmitted beam. Lateral displacement of the mirror can be actuated manually, such as using a fine screw, or by electrical signals, such as controlling the current passing through the legs to regulate electromagnetic forces. A 2D deflector can be made by using two ULT mechanisms in cascaded arrangement with each scanning on a different plane.

A reflector unit in the CMA device can also have more than two finite deflection angles. For small deflection angles, a multiple-angle ULT mechanism can be constructed by combining and coupling two ULT mechanisms to provide 4 angular positions for a reflector unit. One approach is to apply a first ULT mechanism as an adjustable position-limiting structure, which can generate two sets of positional limits. A second ULT mechanism carrying the reflector mirror then uses the first ULT mechanism as positional limits. By actuating the two ULT mechanisms independently, four angular positions on the second ULT mechanism can be generated. Another approach is to use a first ULT mechanism as an adjustable base structure and build a second ULT mechanism, which carries the reflector mirror, on top of the first ULT mechanism. By actuating the two ULT mechanisms independently, this combined structure will also have four angular positions.

A CMA device can be further cascaded (staged) with other beam scanning or deflecting devices to increase scan angle or increase resolution. For example, a CMA device can be arranged after (i.e., downstream of) an analog fine-angle scanner to increase the latter's angle of scan while still keeping its fine resolution. Two CMA devices of different resolution ranges can also be cascaded for the same purpose.

According to above contents, the cascaded mirror array and the scanning system of the present invention can have at least one of the following advantages.

First, the cascaded mirror array and the scanning system can use simple mechanism members to create the change in the deflection angle of the laser light beam, instead of using a micro-electromechanical process so that the precision required for the deflection angle can be achieved and the device manufacturing cost can be effectively reduced.

Secondly, the cascaded mirror array and the scanning system can use a structure in which the legs can be tilted to the landing points, and the electromagnetic driving manner of controlling the direction of the current to change different angle of the deflection mechanism, thereby improving operational convenience and response efficiency. Furthermore, the cascaded mirror array and the scanning system of the present invention does not need to use complicated control circuits, so the overall volume and weight of the scanning device can be reduced, and weight reduction of the scanning device can be achieved.

Thirdly, the cascaded mirror array and the scanning system can form different scanning angles by connecting multiple cascaded arrays, or increase the scanning angle range by using the multi-angle deflection mechanism, thereby increasing the variety of the change range of deflection angles, and make the cascaded mirror array compatible with various scanning devices.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
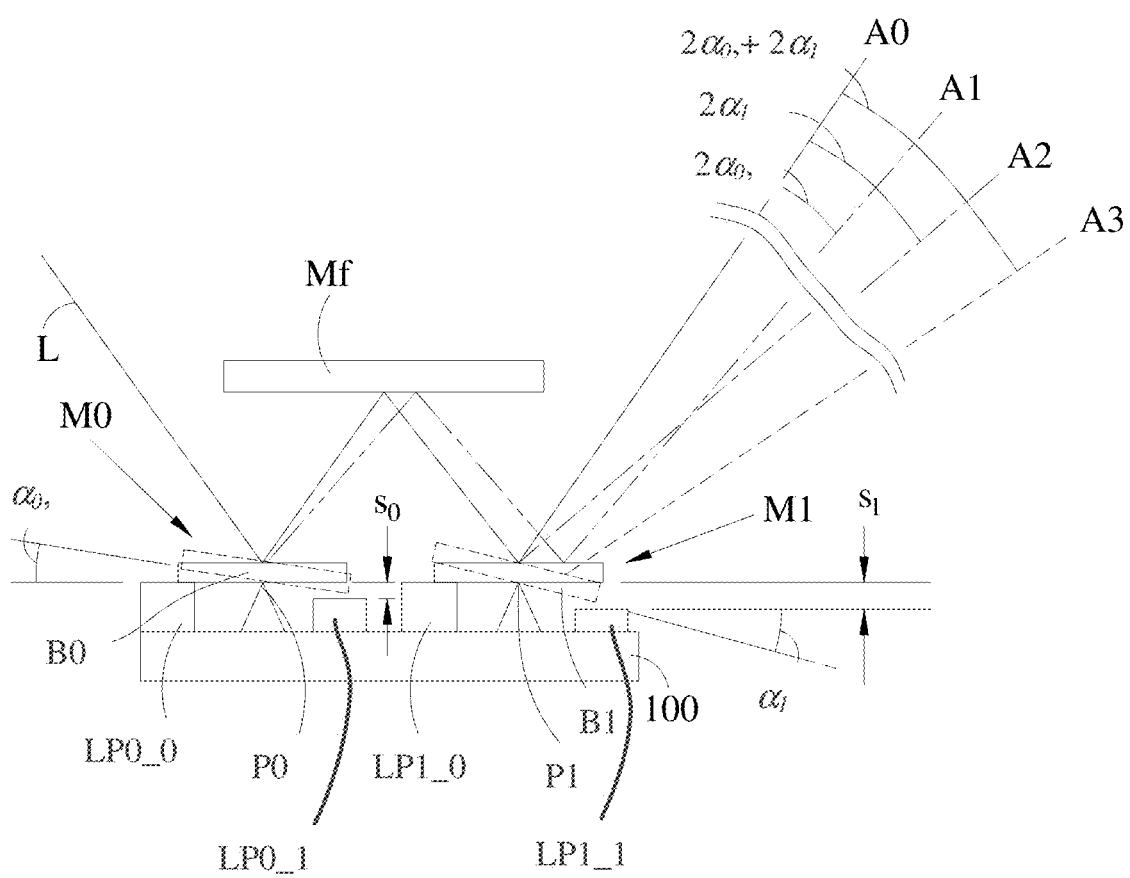
FIG. 1 is a schematic view of a cascaded mirror array scanner of 2-bit as an example to explain the principle of the present invention.

The following embodiments of the present invention are herein described in detail with reference to the accompanying drawings. These drawings show specific examples of the embodiments of the present invention. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on" or "connected to" another element or layer, it can be directly on or connected to the other element or layer, or intervening elements or layers may be present. In contrast, when an element is referred to as being "directly on" or "directly connected to" another element or layer, there are no intervening elements or layers present.

In addition, unless explicitly described to the contrary, the word "comprise/include" and variations such as "comprises/includes" or "comprising/including", will be acknowledged to imply the inclusion of stated elements but not the exclusion of any other elements.

FIG. 1 depicts the basic idea of a CMA scanner by using a 2-mirror array for example. A laser beam L enters the scanner to hit two movable mirrors (M0, M1) in sequential order, via a fixed relay mirror (Mf) set at the opposite side, and then exits the scanner. Assuming mirror M0 can tilt (rotate) between two angular positions by an angle of $\alpha_0$ about a pivot P0 and mirror M1 does similarly with a tilt angle of $\alpha_1$ about a pivot P1, and further assuming $(\alpha_0, \alpha_1)$ is a geometric progression of a common ratio of 2, that is, $\alpha_1 = 2\alpha_0$, by switching (rotating) the two movable mirrors independently, the output laser beam can be deflected to 4 different directions (A0, A1, A2, A3), with the angle difference between A0 and A1 $2\alpha_0$, A0 and A2 $4\alpha_0$, and A0 and A3 $6\alpha_0$. That is, two mirrors allow 4 variations of exit angle in arithmetic progression. Thus, N cascaded reflector units in a linear array allow $2^N$ variations of exit angle (full scanning angle). Assuming a full scanning angle $\varphi$, the corresponding mirror deflection angle $\alpha_i$ of each reflector unit can be shown in the following equation (1).

$$\alpha_i = \frac{1}{2}\frac{\varphi}{2^{(N-i)}} = \frac{\varphi}{2^{(N-i+1)}}, i = 0, 1, 2, \ldots, N-1 \quad (1)$$

The construction of the CMA applies direct reflection by simple reflectors on simple mechanical structure so that light beam quality is affected to the minimum, control can be simplified and manufacturing can be done without the need of MEMS fabs. In comparison to an existing MEMS galvano mirror based on single reflector, the CMA concept applies simple deflection mechanisms based on easy to make position limiting structures to provide repeatable precision angular positions driven by digitized electrical signals from simple circuits.

As illustrated in FIG. 1, assuming each mirror is mounted on a simple lever mechanism, the angular positions of a mirror can be controlled by setting a proper height difference ($s_0$ of M0, $s_1$ of M1) between the two landing points (LP0_0 and LP0_1 for M0 and LP1_0 and LP1_1 for M1) of the mirror. Thus, the deflection mechanisms are mechanically digitized, so precision and stability requirement on driving signals to each reflector unit is far less critical than that for a MEMS galvano mirror. Dynamic response of point to point scanning can be fast. Shock resistance can be very high. Development and manufacturing cost can be significantly low because the mechanical structure can be built by non-MEMS processes and can be modularized.

In general, the precision of the discretized angular positions of each array reflector is maintained by a support structure (rotatable member B0 and pivot P0 of reflector unit M0, or rotatable member B1 and pivot P1 of reflector unit M1), which supports the reflector while allowing it to rotate or tilt, and a set of positioning limiting structure (the two landing points), which limits the allowable angular position of the array reflector between the two angular positions. The mirror can be a discrete mirror or can be a coating on the rotatable member (B0, B1). The digitized switching electrical signal does not steer the reflector or conduct precision control. The signal merely deflects the reflector and the support and position limiting structure determine the discretized angular positions. In this way, the cost of electrical control can be minimized and the structures and precisions can be made and maintained by traditional manufacturing methods.

Depending on the tilting angle of an individual reflector unit, two different constructions of deflection mechanism can be used. For mirrors of large tilting angles, a simple lever deflection mechanism, e.g. mirror on a torsion beam or a pair of torsion hinges, and electromagnetic driving similar to a MEMS galvano mirror can be applied, for example, referring to Urey H. (2002), "Torsional MEMS scanner design for high-resolution display systems," Optical Scanning II, Proc. SPIE Vol. 4773, pp. 27-23, Seattle, Wash. For mirrors of small tilting angles, using the simple lever mechanism will need very small height differences between the landing points, as shown in the example in Tab. 1, which shows landing points height differences of different digital positions in a CMA of N=12 mirrors and $\varphi$=30°. The height differences in the lower digital positions (i=0-6) go down below a few micrometers to sub-micrometers. The associated manufacturing cost will be high because tolerances have to be very tight to avoid significant angular errors, even if applying traditional manufacturing processes other than MEMS fabs. Traditional manufacturing processes such as regular machining and polymer injection molding have dimensional tolerances roughly between 10 to 100 μm, unless expensive grinding and polishing are involved, referring to Kalpakjian and Schmid 2010, Manufacturing Engineering and Technology, 6th ed., Chap. 40, pp. 1150-1151.

TABLE 1

Range of mirror tilting angle and landing points height differences, $s_i$ = R tan $\alpha_i$, of different digital positions in a CMA of N = 12 mirrors, $\phi$ = 30°, by eqn. (1), assuming length of mirror base 4 mm (rotation radius R = 2 mm)

| Index of reflector unit i | 0 | 1 | 2 | 3 | 4 | 5 |
|---|---|---|---|---|---|---|
| Range of tilting angle $\alpha_i$ (degree) | 0.0037 | 0.0073 | 0.0146 | 0.0292 | 0.0584 | 0.117 |
| tan $\alpha_i$ (≈$\alpha_i$ in radian) | 6.5E−5 | 1.3E−4 | 2.5E−4 | 5.1E−4 | 1.0E−3 | 2.0E−3 |
| Height difference between landing points $s_i$ (micro-meter) | 0.13 | 0.26 | 0.52 | 1.04 | 2.08 | 4.16 |

| Index of reflector unit i | 6 | 7 | 8 | 9 | 10 | 11 |
|---|---|---|---|---|---|---|
| Range of tilting angle $\alpha_i$ (degree) | 0.234 | 0.467 | 0.934 | 1.88 | 3.75 | 7.5 |
| tan $\alpha_i$ (≈$\alpha_i$ in radian) | 0.0041 | 0.0082 | 0.016 | 0.033 | 0.066 | 0.132 |
| Height difference between landing points $s_i$ (micro-meter) | 8.17 | 16.3 | 32.6 | 65.6 | 131 | 264 |

Figure 2A:
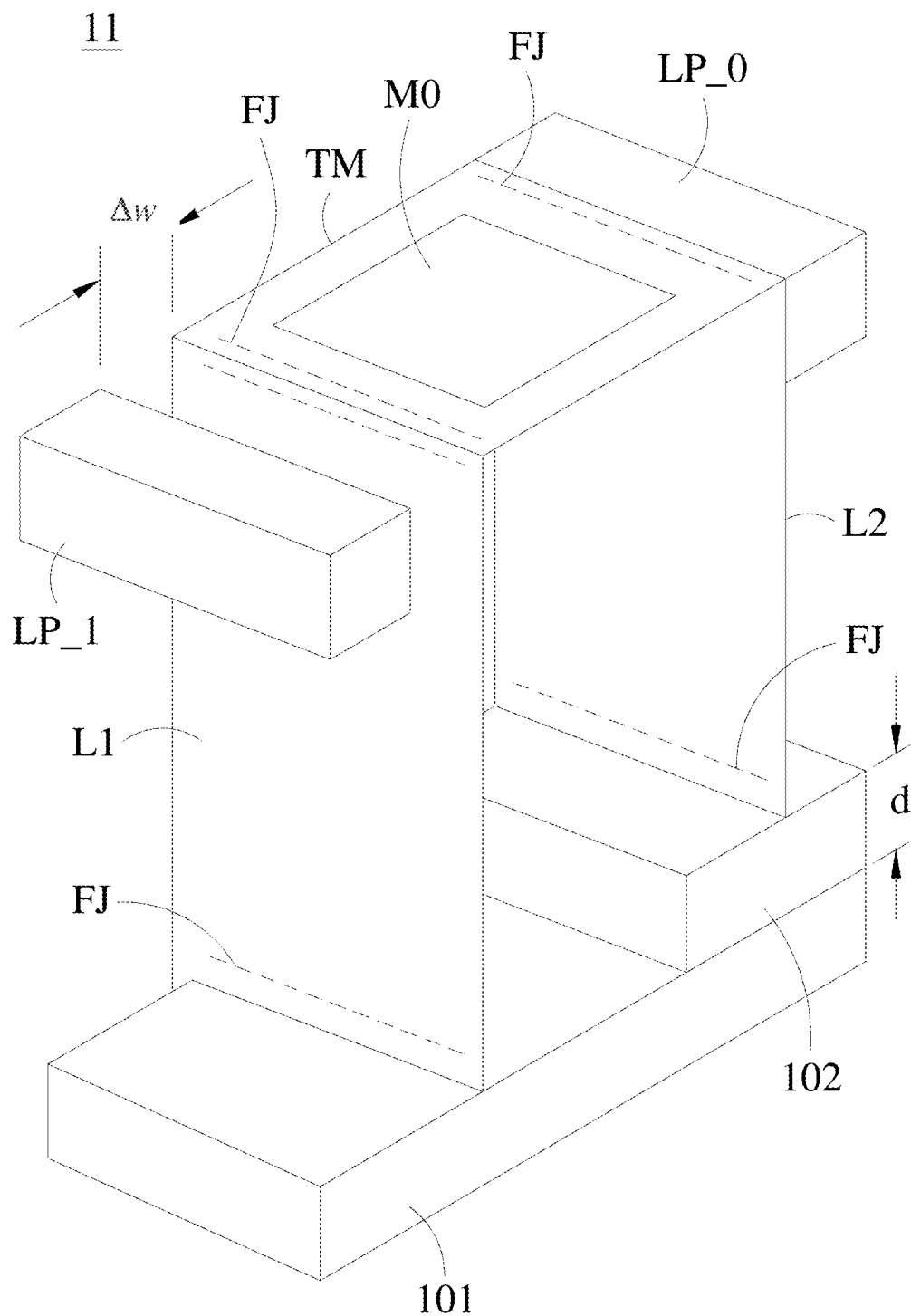
FIGS. 2A and 2B are schematic views of an uneven-leg tilting (ULT) mechanism as a support structure for a reflector in a cascaded mirror array, according to an embodiment of the present invention.

Therefore, to facilitate small tilting angles, a new type of micro-deflection mechanism, called Uneven-Leg Tilting (ULT) mechanism, is devised. Referring to FIG. 2A, the illustrated ULT mechanism 11 is in principle a four-bar linkage, jointed by hinge-like flexible joints (FJ), with the mirror (M) on the top bar (TM) supported on two parallel legs (L1, L2) with a length difference d. The base 101 and a block 102 of height d on the base serves as the fourth bar. The lower end of leg L1 is connected to the base and the lower end of leg L2 is connected to the block 102. The block 102 of height d facilitates the aforementioned length difference of the two legs.

Figure 2B:
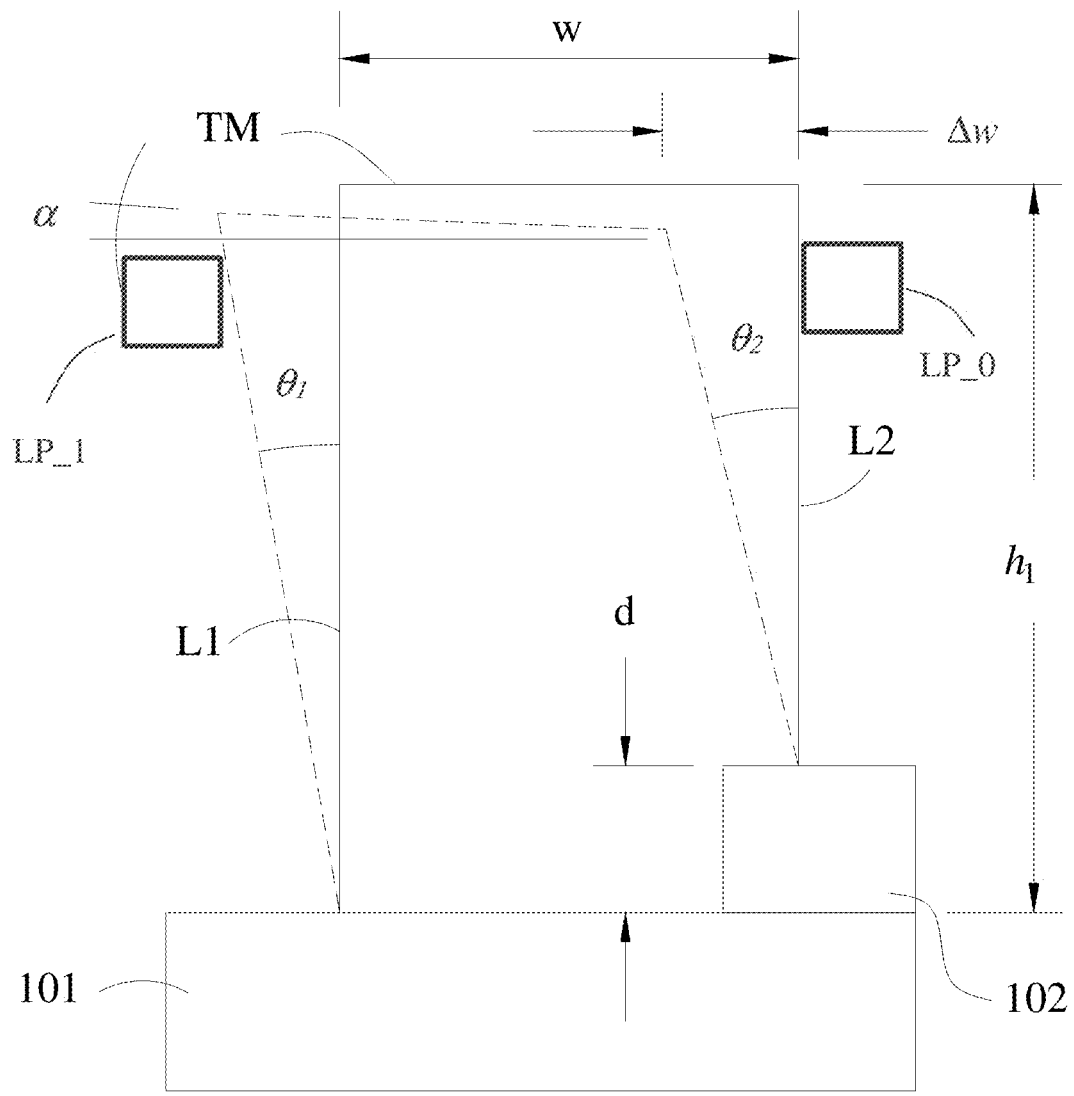
Figure 3:
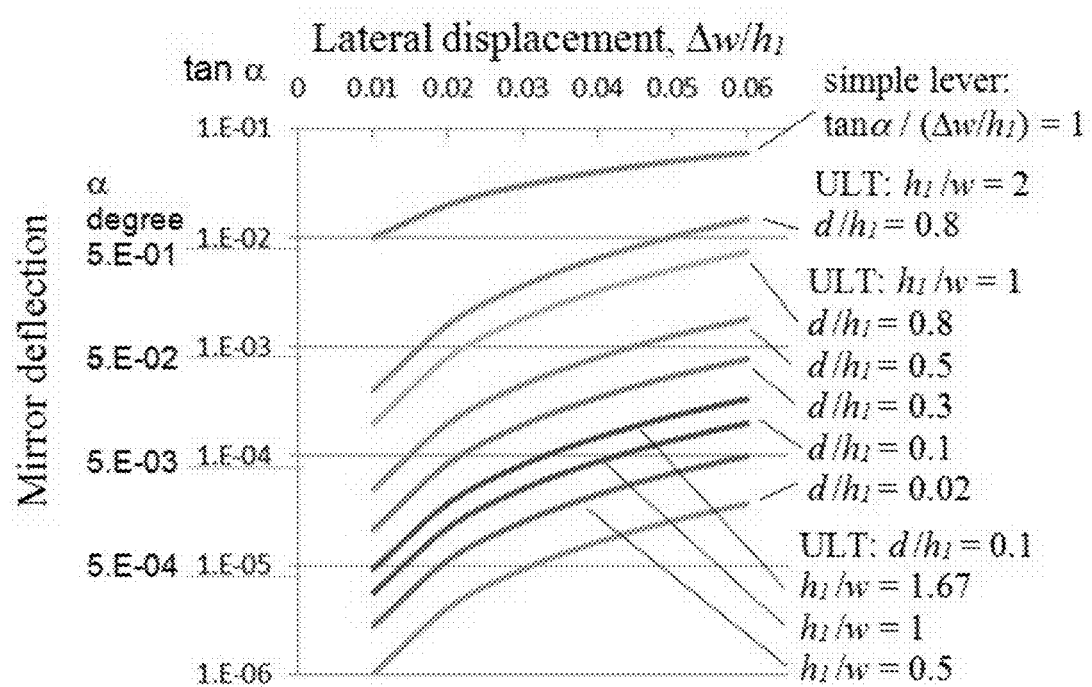
FIG. 3 is the relationship between reflector deflection angle and reflector lateral displacement of typical designs of the ULT mechanism according to the present invention.

Referring to FIG. 2B, side view of FIG. 2A, when the mechanism tilts to one side, the two legs rotate by two slightly different angles ($\theta_1$, $\theta_2$) and the vertical heights of the two legs change differently due to the uneven leg lengths. In other words, the tilting of the ULT mechanism results in, in the transverse direction of the mirror's lateral displacement, a differential displacement between the two ends of the top member that rotates the mirror by a small angle ($\alpha$). In this mechanism, the landing points (LP_0, LP_1) are placed at the two ends, to limit the deflection or rotation angle of the mirror (top link™) at two angular positions: 0 and $\alpha$.

The ULT mechanism can have a very significant mechanical reduction effect on the rotation of the mirror on the top linkage member. Geometric analysis of FIG. 2B gives an approximation of the tilting angle $\alpha$ as the following expression:

$$\alpha = \sin^{-1}\left[\frac{h_1}{w}\left((\cos\theta_1 - \cos\theta_2) + \left(\frac{d}{h_1}\right)(\cos\theta_2 - 1)\right)\right]$$

$$\theta_1 = \sin^{-1}\left(\frac{\Delta w}{h_1}\right)$$

$$\theta_2 = \sin^{-1}\left(\frac{\Delta w/h_1}{1 - d/h_1}\right)$$

Wherein $h_1$ is the length of leg L1, w is the length of the top member, $\Delta w$ is the lateral displacement of the top member, $\theta_1$ is rotational angle of the first leg L1 and $\theta_2$ is the rotational angle of the second leg L2. FIG. 10 shows the mirror deflection angle $\alpha$ in relation to the mirror's lateral displacement as calculated from the above equations in comparison with a simple lever mechanism. It can be seen that by adjusting the ratios of geometric parameters including the lengths of the top member (w) and the difference of leg lengths ($d/h_1$) with respect to the leg length ($h_1$) and setting proper lateral displacement ($\Delta w/h_1$), the ULT mechanism can generate rotation angles covering a very wide range from over 10 milli-radian down to a few micro-radian by the same magnitudes of lateral displacement. Compared to a simple lever mechanism, the ULT mechanism generated rotation angles can be up to 4 orders of magnitude smaller. This range of rotation angle approaches the range of resolution angle of commercial galvano mirrors, including traditional and MEMS. Further, if the lengths of the top member and of the legs are of a few millimeters, then the corresponding lateral displacements are about several hundred micrometers. Distances of this size can be generated by structural features that can be easily made by traditional manufacturing processes, instead of using a microelectromechanical process, thereby effectively reducing production cost.

Figure 4:
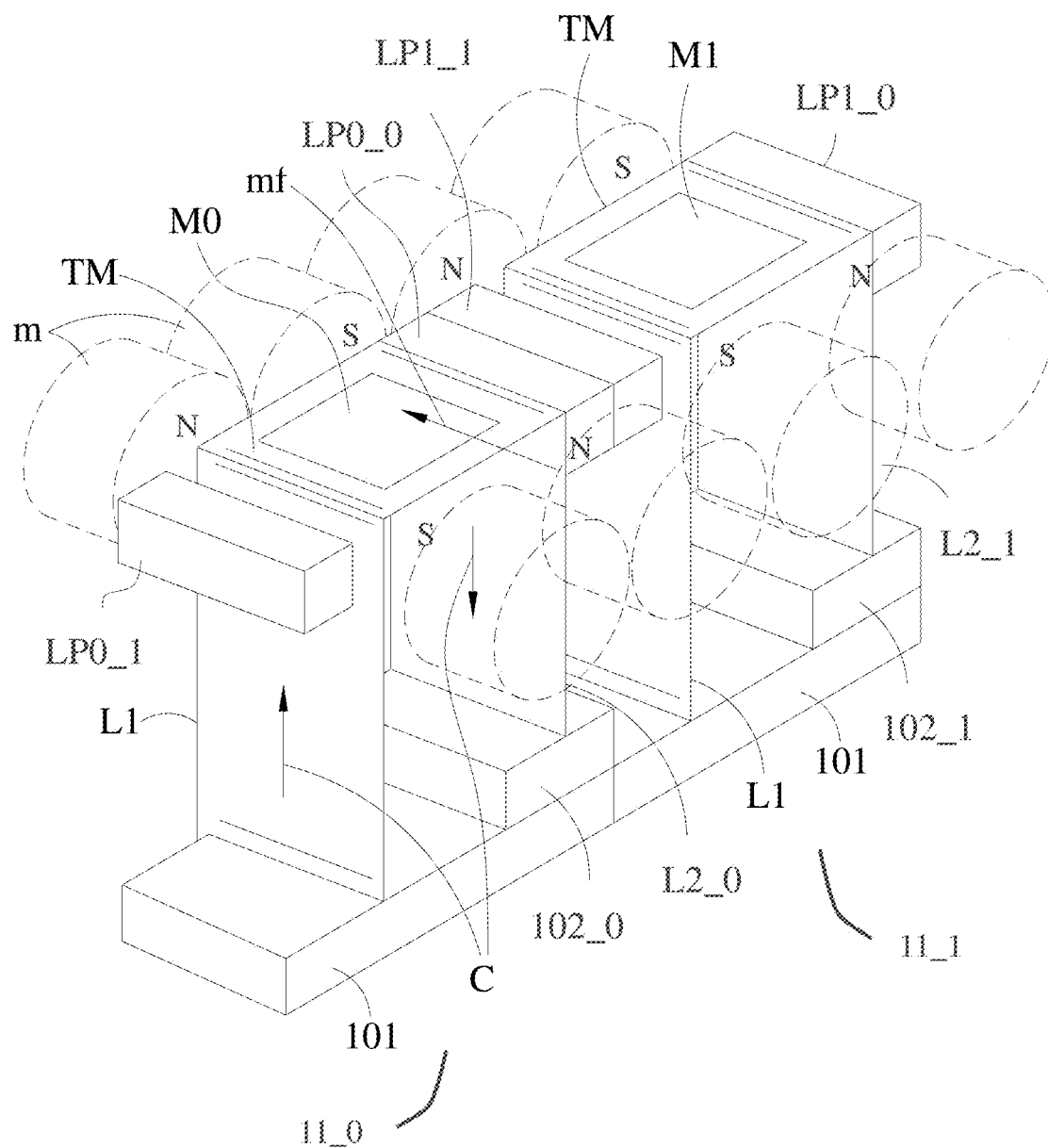
FIG. 4 is a schematic view of a cascaded mirror array driven by electromagnetic method, according to an embodiment of the present invention.

The ULT mechanisms can use an electromagnetic actuation arrangement as shown in FIG. 4. Two array reflectors (M0, M1) on two different ULT mechanisms (11_0, 11_1) are shown. Because the predetermined rotation angles of the two array reflectors are different, the lengths of the short legs (L2_0, L2_1), the heights of the blocks (102_0, 102_1) at the bases and the landing points (LP0_0, LP0_1, LP1_0 and LP1_1) are different. Magnetic fields can be established across the legs by using either permanent or electro magnets (m) at both sides of the legs. The magnetic pole directions (N, S) (only one pole of each magnet is labelled for clarity) are arranged to match the electric current C passing through the loop of the ULT mechanism. The electric current C can be passed through the loop of a ULT mechanism, in perpendicular directions relative to the directions of magnetic field, by entering from one leg and flowing out of the other, to induce a lateral force to tilt the mechanism. Reversing the current direction reverses the directions of the forces and the tilting.

Example Prototype:

A 4-bit CMA scanner prototype was built as an example of implementation details, to demonstrate the feasibility of the proposed concept and to show that the proposed system can be made from common materials in a regular lab without using microfabrication processes.

Figure 5A:
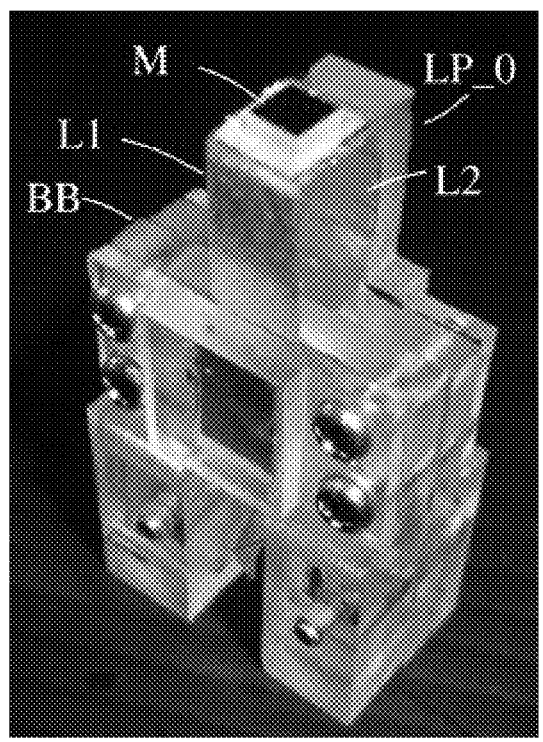
FIG. 5A shows a prototype of a single reflector unit with the ULT mechanism.
Figure 5B:
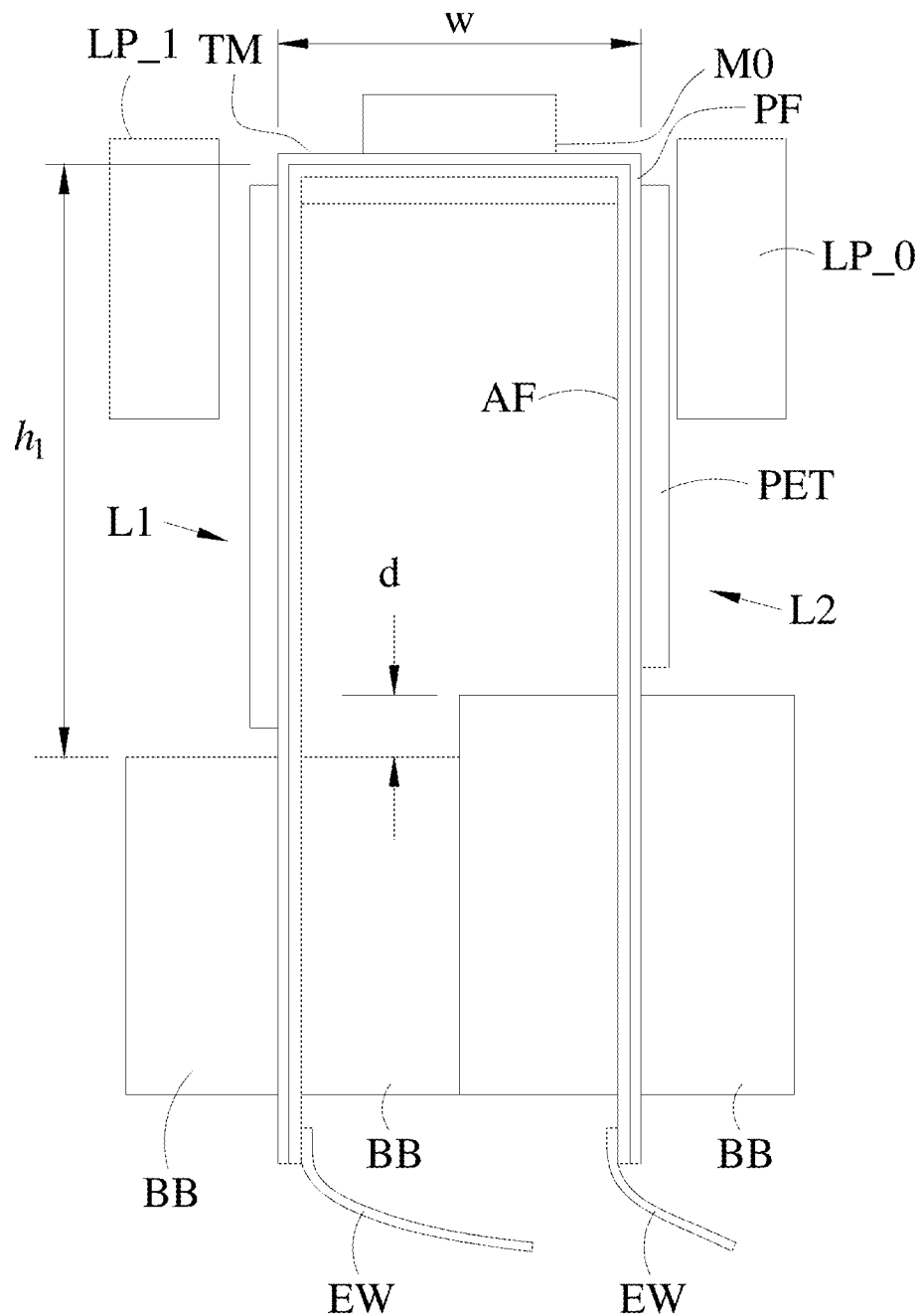
FIG. 5B shows its construction in a side view.

FIG. 5A shows a prototype of a single reflector unit with the ULT mechanism and FIG. 5B shows its construction in a side view. The reflector M0 is a first surface mirror with a size of 3×3×1 mm. The uneven-leg tilting mechanism 13 includes a plastic base BB, a first leg L1, a second leg L2, and a top link TM. The reflector M0 is disposed on the top link TM. In the embodiment, the length w of the top link TM is 6 mm, the length h1 of the first leg L1 is 10 mm. The top link and the legs has a width of 5 mm and is basically made from stacking three layers of different materials. The flexural joints were made of a layer of laminated polyester films PF of a thickness of 0.05 mm. Three pieces of PET sheet material of thickness 0.1 mm and width 5 mm are attached to the laminated polyester films PF at the top link and the two legs respectively to increase the stiffness of the legs and the top link. A layer of aluminum foil AF of a thickness of about 16 micro-meter was used as conductor for carrying electric current, in order to form the current loop along the first leg L1, the top link rod TM, second leg L2, and base BB. All layers of materials were assembled together by glue. The aluminum foil AF is connected to electric wires EW inside the plastic base BB so as to form a single layer of current loop. The flowing direction of the current can be controlled by a control and power supply circuit, and the driving force in lateral direction can be generated by the magnetic field, so as to push the first leg L1 and the second leg L2 to tilt.

Figure 6A:
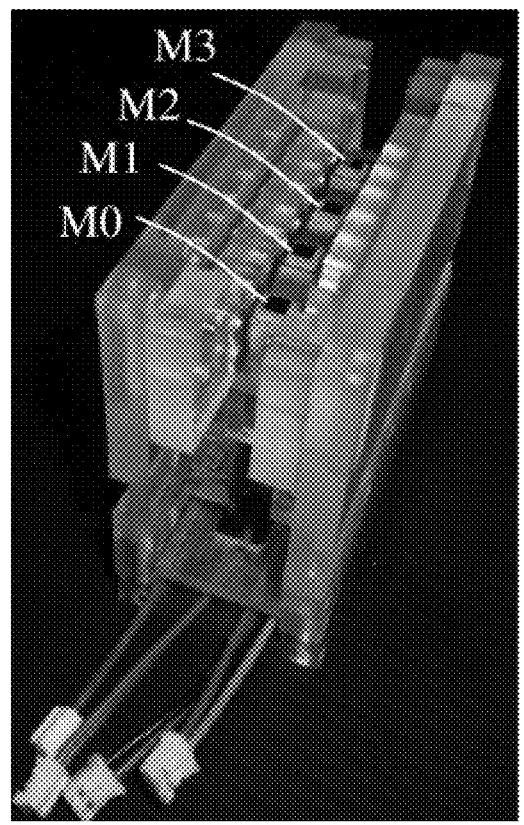
FIGS. 6A, 6B and 6C show the photographs and the configuration of a 4-bit prototype scanner according to an embodiment of the present invention.
Figure 6B:
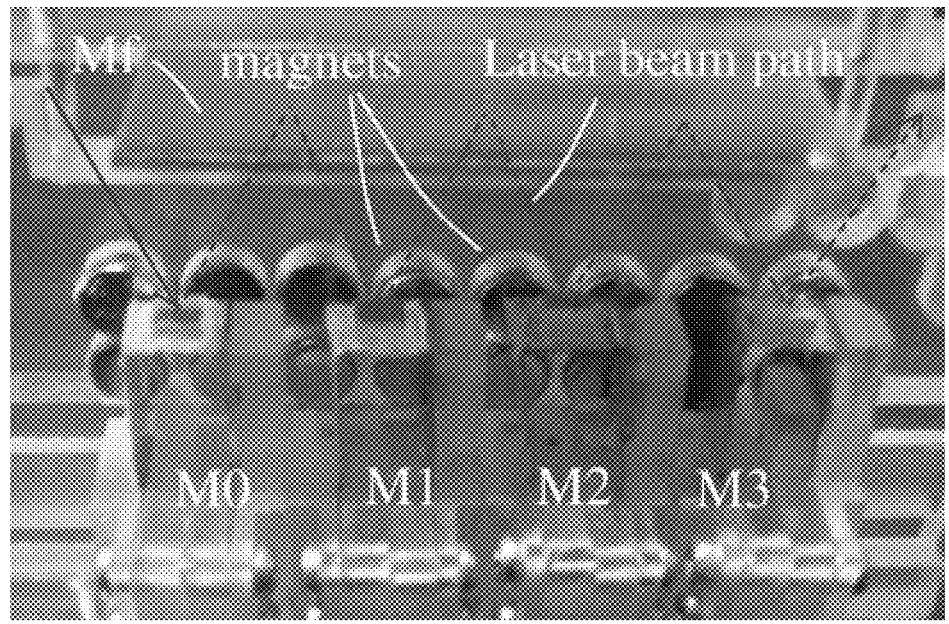
Figure 6C:
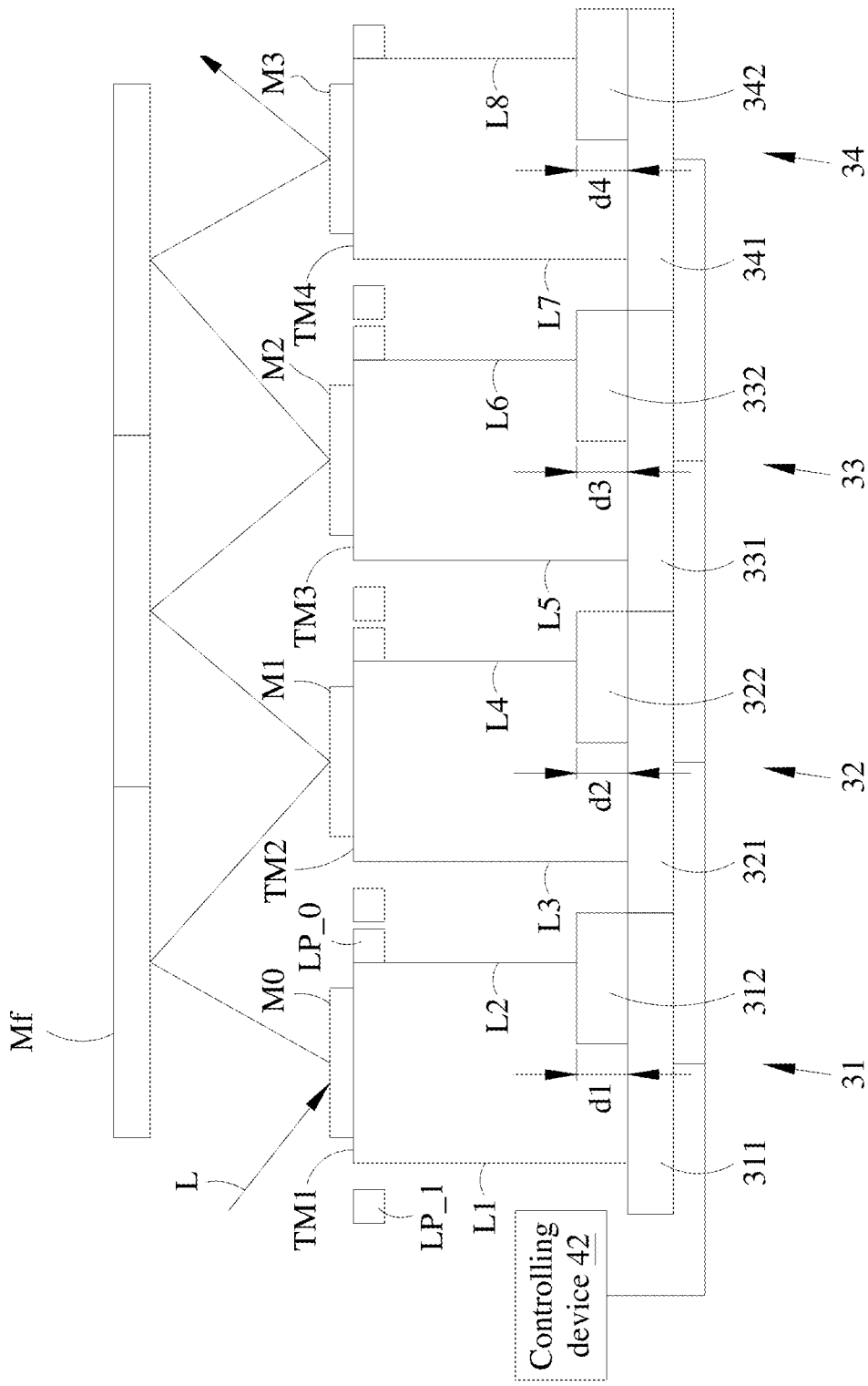

The configuration of the prototype scanner is depicted in FIG. 6C in its side view, with the path of the laser beam L. Similar to the arrangement of FIG. 1, a relay reflector Mf is placed facing the 4 array reflectors (M0, M1, M2 and M3). But different from FIG. 1, all 4 reflector units here use the ULT mechanism as support structures, instead of the simple lever mechanism. Leg length differences (d1, d2, d3, d4) of the 4 ULT mechanisms (31, 32, 33, 34) were 1.0, 2.0, 3.3 and 4.9 mm respectively, to provide a different deflection angle for each of the 4 array reflectors. FIG. 6A shows the 4-unit (4-bit) CMA prototype scanner in perspective view, with its top relay reflector Mf removed. FIG. 6B show the internal arrangement of the CMA prototype scanner and the laser beam path, with magnets on the near side removed. Each reflector unit had 8 NdFeB magnets arranged in similar way as FIG. 4. Two L298N drive boards (of ST Microelectronics), each with two outputs capable of supplying positive or negative driving voltages, controlled via an Arduino MEGA 2560 board from a personal computer, drove the 4 reflector units, through a resistor in series for each reflector unit.

Figure 7:
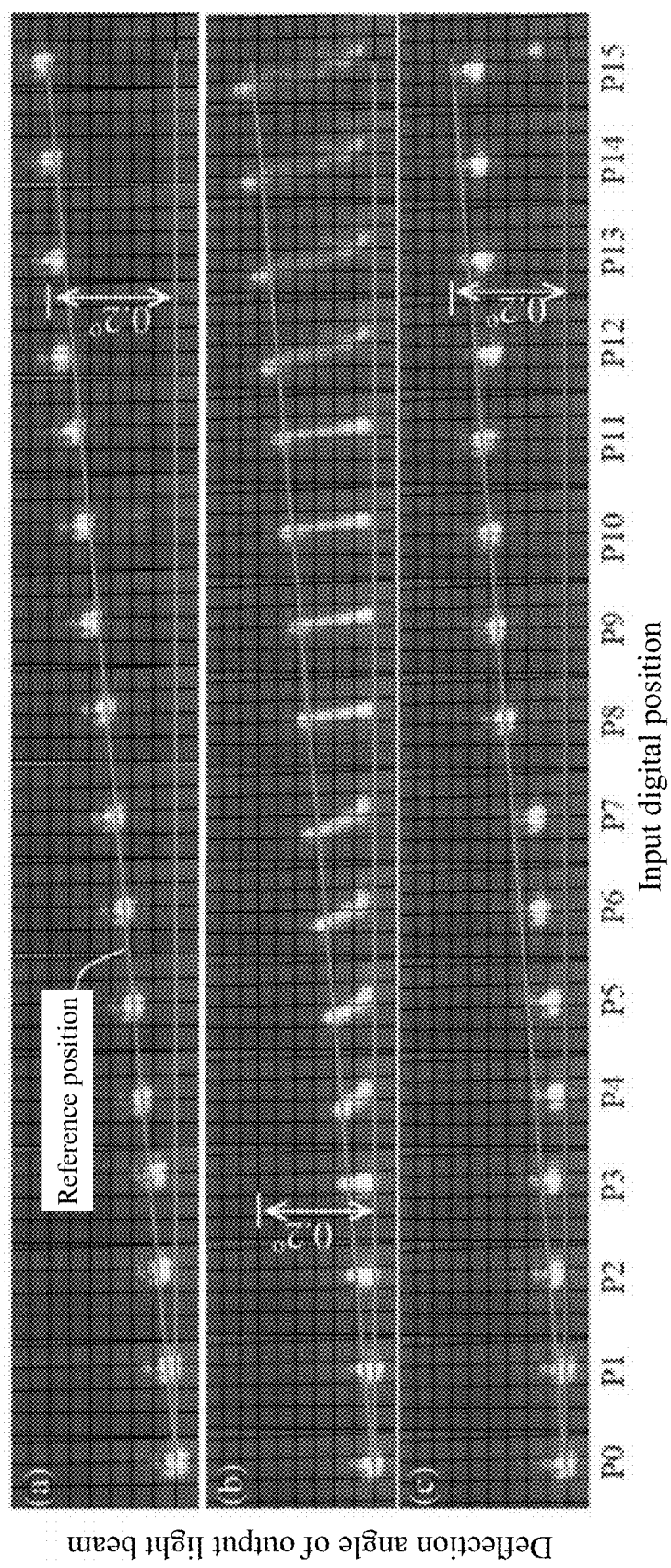
FIG. 7 shows assembled photographs of projected scanning laser spots on the target screen showing 4-bit deflections of the 4-bit prototype under different settings.

The prototype was set up to deflect a diode laser beam onto a gridded paper target screen. A digital camera recorded position changes of the projected laser spot on the screen. FIG. 7 shows assembled photographs of projected laser spots on the target screen showing 4-bit deflections of the prototype under different settings. The full scan angular range was set to 0.2°. The smallest deflection angle on reflector M0 was thus near 0.0125° (1/16 of 0.2°). In FIG. 7, (a) shows results at scanning frequency of 1 Hz, calibration done at 1 Hz. (b) is the case of scanning frequency of 300 Hz, calibration at 300 Hz. (c) is the case of scanning frequency of 1 Hz, calibration at 300 Hz. Although there are some errors and deviations from theoretical values, due to non-ideal fabrication and assembly issues in a lab environment, the results generally show 16 different laser scanning positions and ranges clearly.

Variations and Other Related Details

Figure 8:
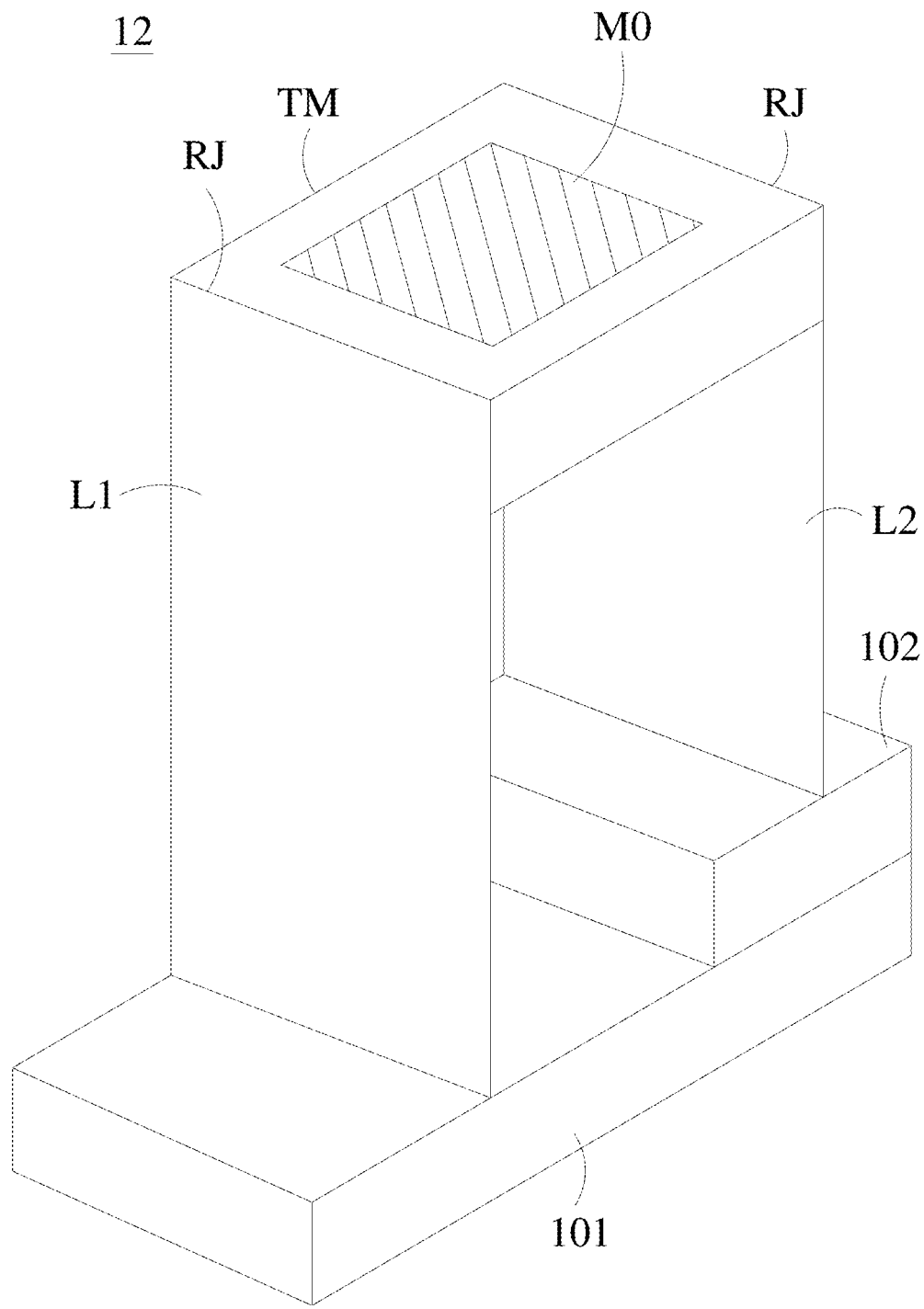
FIG. 8 is a schematic view of another embodiment of the ULT mechanism according to the present invention.

Other than the 4-bar linkage design of FIG. 2, the ULT mechanism can also apply a construction similar to a clamped-flat-spring type flexural bearing. That is, instead of using deformable joints at the 4 corners, the 4 corners of the basic 4-member structure can be made rigid but the two legs are made flexural to facilitate lateral displacement and reflector tilting. FIG. 8 shows the concept of such an alternative ULT construction 12. The top member (TM) can be made of acrylic and two thin PET strips (L1, L2) were glued to the edges (RJ) of the top member as legs. Very thin metal sheets or wires can also be used as leg materials. The relationship between the lateral displacement and the tilt angle of the top member of this construction is different from the case of 4-bar linkage. However, the mechanical amplification ratio is still on the same order of magnitude as the 4-bar linkage design. In order to maintain the overall structural shape, the legs must have enough stiffness. Therefore, this construction has a higher overall stiffness and larger driving forces are required as compared to the 4-bar linkage design. However, this is also the advantage of this construction because it is able to carry a larger load, such as a reflector of a larger aperture, on its top member without affecting the kinematics of the ULT mechanism. A macro size ULT mechanism with large load capacity can also be made using this construction and can be used to scan a high power laser beam.

Figure 9:
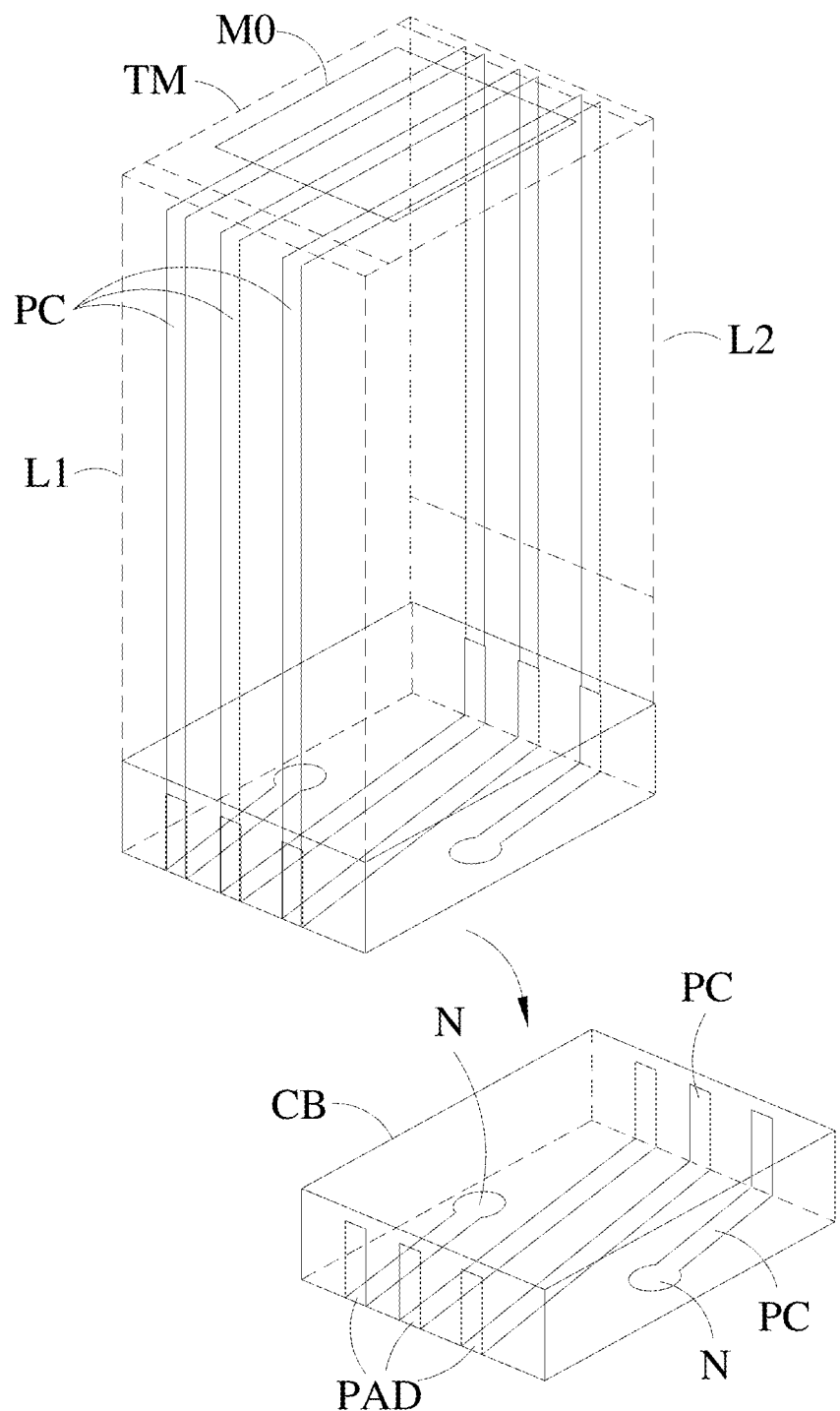
FIG. 9 shows an example design of an ULT structure carrying multiple conductor loops for passing switching current according to the present invention.

It is desirable to have large electro-magnetic driving force in order to increase high frequency amplitude, scanning speed and frequency. Increasing electro-magnetic driving force can be achieved by using multiple current loops in the ULT mechanism, while keeping the supplied current and power unchanged. FIG. 9 shows an example design of an ULT structure carrying multiple conductor loops. Multiple parallel conductor lines (PC) can be patterned inside the legs and under the top member of the ULT mechanism by printed circuit board techniques such as etching of a metal clad foil or conductor printing techniques. By similar techniques, a connector block (CB), which carries conductor lines and contact pads (PAD) positioned corresponding to the parallel conductor lines (PC), can also be made. By assembling the ULT legs and top members to the connector block, multiple conductor loops of a single conductor line can be created. External circuit can then be connected to the two terminals (N, N) to provide current on multiple loops.

Figure 10A:
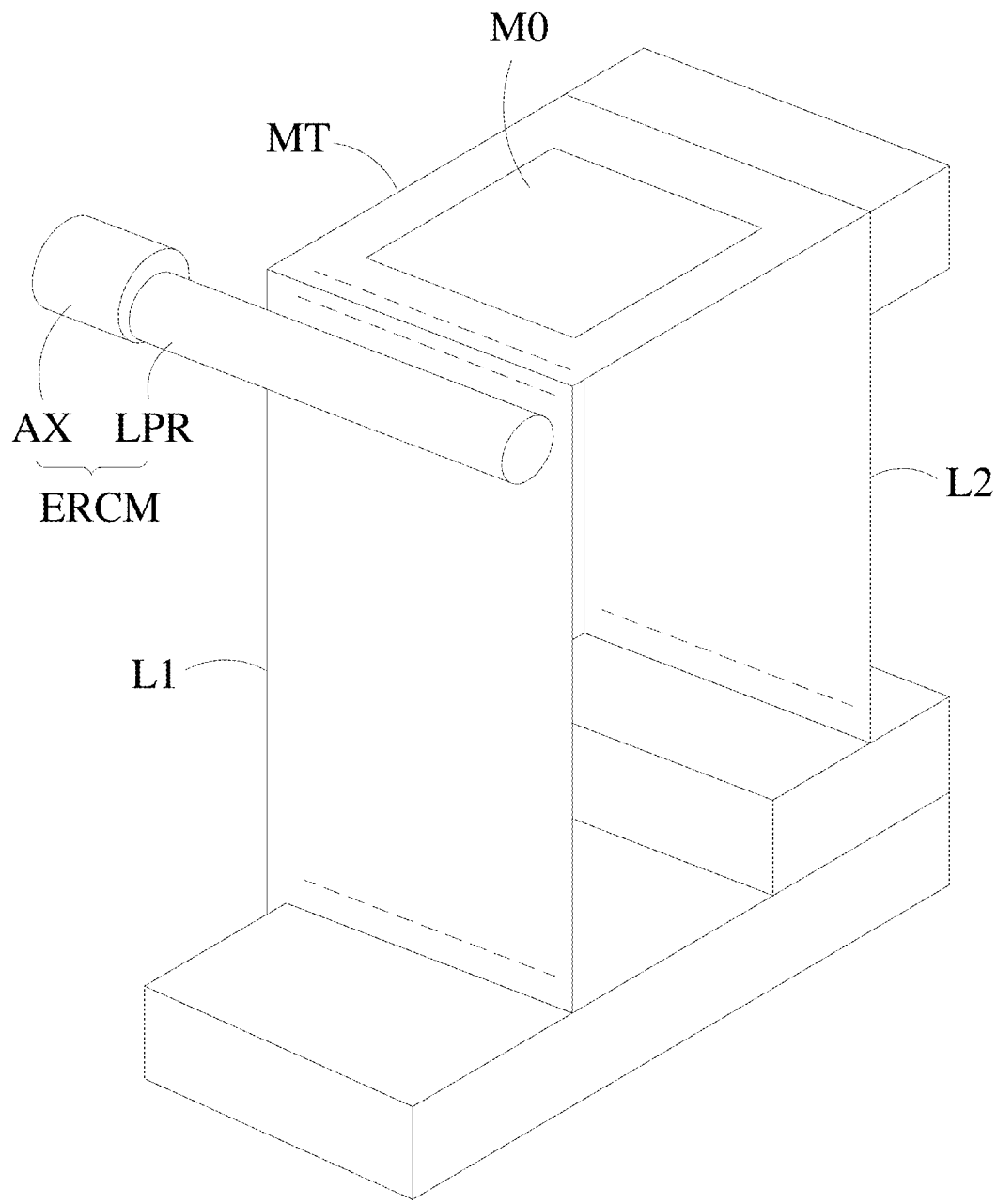
FIGS. 10A, 10B and 10C are schematic views of a calibration mechanism of a cascaded mirror array according to an embodiment of the present invention.
Figure 10B:
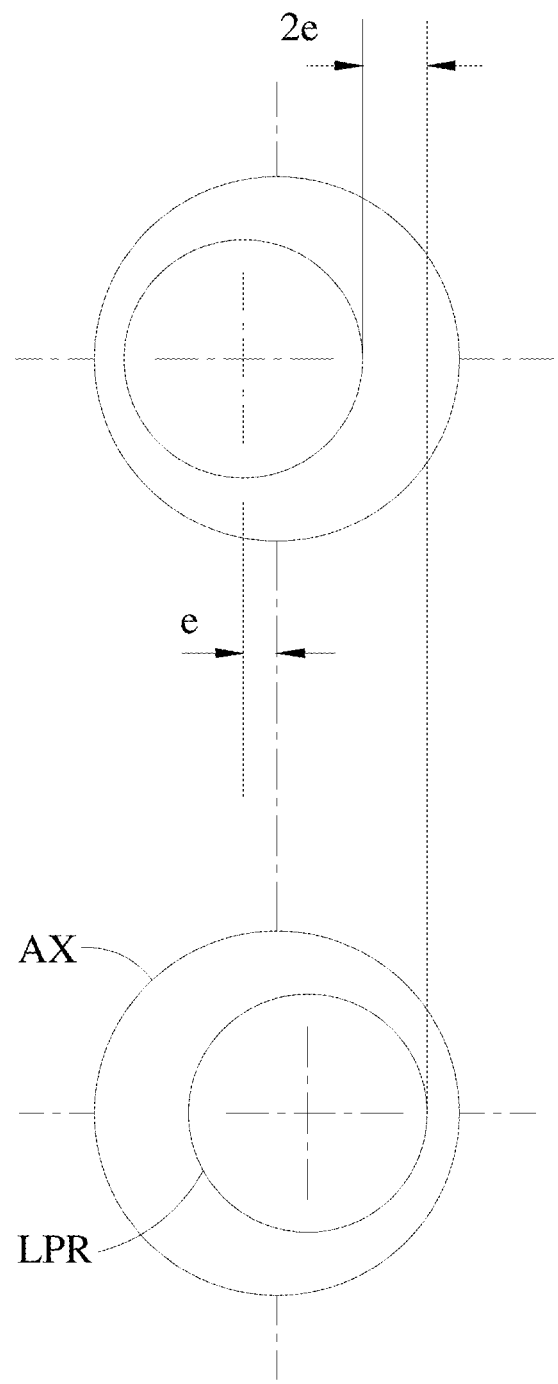

Please refer to FIGS. 10A and 10B, which are schematic views of a calibration mechanism of a cascaded mirror array according to an embodiment of the present invention. FIG. 10A is a schematic view of the position disposed on the calibration mechanism, and FIG. 10B is a schematic view of the adjustment operation. As shown in FIGS. 10A and 10B, the uneven-leg tilting mechanism can include an eccentric rod calibration mechanism ERCM mounted to an eccentric position of a shaft AX by a rod LPR. The rod LPR is connected to the first leg L1, and the lateral displacement of the first leg L1 can be adjusted by rotating the rod LPR. When the length of each of the top link rod TM and legs L1 and L2 is a few millimeters, the lateral displacement can be adjusted by tens to hundreds of micro-meters to enable the uneven-leg tilting mechanism to generate a precise deflection angle. As shown in FIG. 10B, an axis of rod LPR deviates from the shaft AX by an offset e. When the calibration mechanism has a rod LPR with thread corresponding to a screw hole on the structural wall, the landing point can be adjusted within the range of 2e by rotating the rod. For example, assuming that the displacement e is 300 microns, the rod can be rotated within one-half turn to adjust the displacement by 600 microns. It should be noted that the dimensional tolerance requirements on the eccentric rod do not need to be extremely strict because the mechanism is adjustable.

Figure 10C:
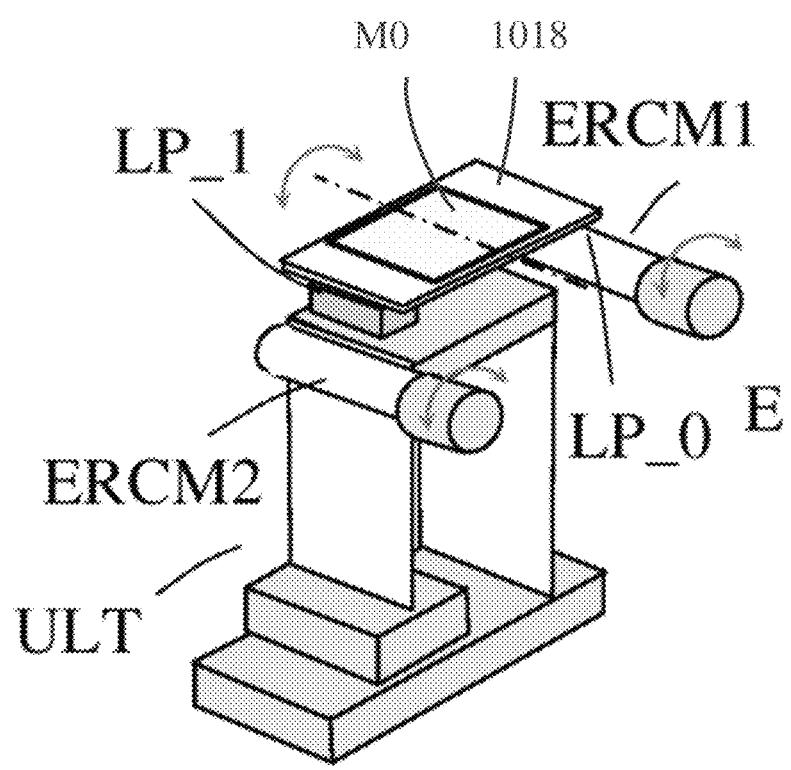

The combination of the eccentric rod calibration and the ULT mechanism with reflector can be applied to reflector unit of mirror deflection angle up to about 10 milli-radians, based on analysis. For reflector units of larger deflection angles, simple lever mechanisms need to be used to carry the reflectors. The challenge is how to set/calibrate these large deflection angles precisely. A preferred design for setting and calibrating large deflection angles of mirrors carried on simple lever mechanisms is shown in FIG. 10C. In FIG. 10C, the simple lever mechanism 1018 carrying the array mirror M0 has two adjustable landing points underneath. One landing point LP_0 is adjustable by a first eccentric rod mechanism (ERCM1) directly. This mechanism provides larger adjustment amounts but is less precise to control, as pointed out above. The other landing point LP_1 is on the top member of a ULT mechanism (ULT) and moves upward or downward and is adjusted indirectly by a second eccentric rod mechanism (ERCM2) in the lateral (horizontal) direction as in the case of FIG. 10A. Because the ULT mechanism can significantly reduce displacement in the vertical direction, the height of landing point LP_1 is adjustable to high accuracy. That is, ERCM1 sets an approximate height difference between the landing points; ERCM2 pushes the ULT mechanism to fine tune the height to approach the accurate final value.

The precision of a cascaded mirror array scanner can be determined by a relationship between a position of a position limiting structure (such as the landing point) and the deflection mechanism (such as flexible joint or leg) carrying reflector. The repeatability is determined by a resting post of the deflection mechanism at the landing point. The reliability of the entire system can be determined by the fatigue limit of the deflection mechanism. The lateral displacement can be adjusted to achieve the required precision, and the adjustable tolerance mechanism can reduce the requirements in the machining tolerance. In order to achieve high repeatability, the mirror deflection mechanism must be repeatedly operated and the landing point and calibration position should be disposed stably. The deflection mechanism operates within the elastic range and the fatigue limit of the flexible material of the joint. In order to achieve high reliability, the deflection mechanism must operate within the fatigue limit of the flexible material of the joint. For the reflector unit, the estimated maximum stress is 7.5 MPa when the mirror lateral displacement is 80 μm. Generally, the fatigue limit of thermoplastic polyester elastomers is between 5 MPa and 11 MPa, the fatigue limit of the Du Pont Hytrel 7246 material is 11 MPa. For the reflector unit with large angle deflection, the deflection angle of the first leg L1 is in about the same magnitude. However, the deflection angle of the second leg L2 becomes several times larger so that material having higher fatigue limit should be used for the second leg L2. For example, the fatigue limit of ABS is as high as 22 MPa, the fatigue limit of polycarbonate is up to 39 MPa, and these high fatigue limits indicate the feasibility of reliability. Since the fatigue limit is related to the sample size, temperature, and the amount of the driving force affecting the bending torque, the design and material of the cascaded mirror array should consider the overall design of the reflector unit, and the actual fatigue limit of the used material should also be determined experimentally.

Figure 11:
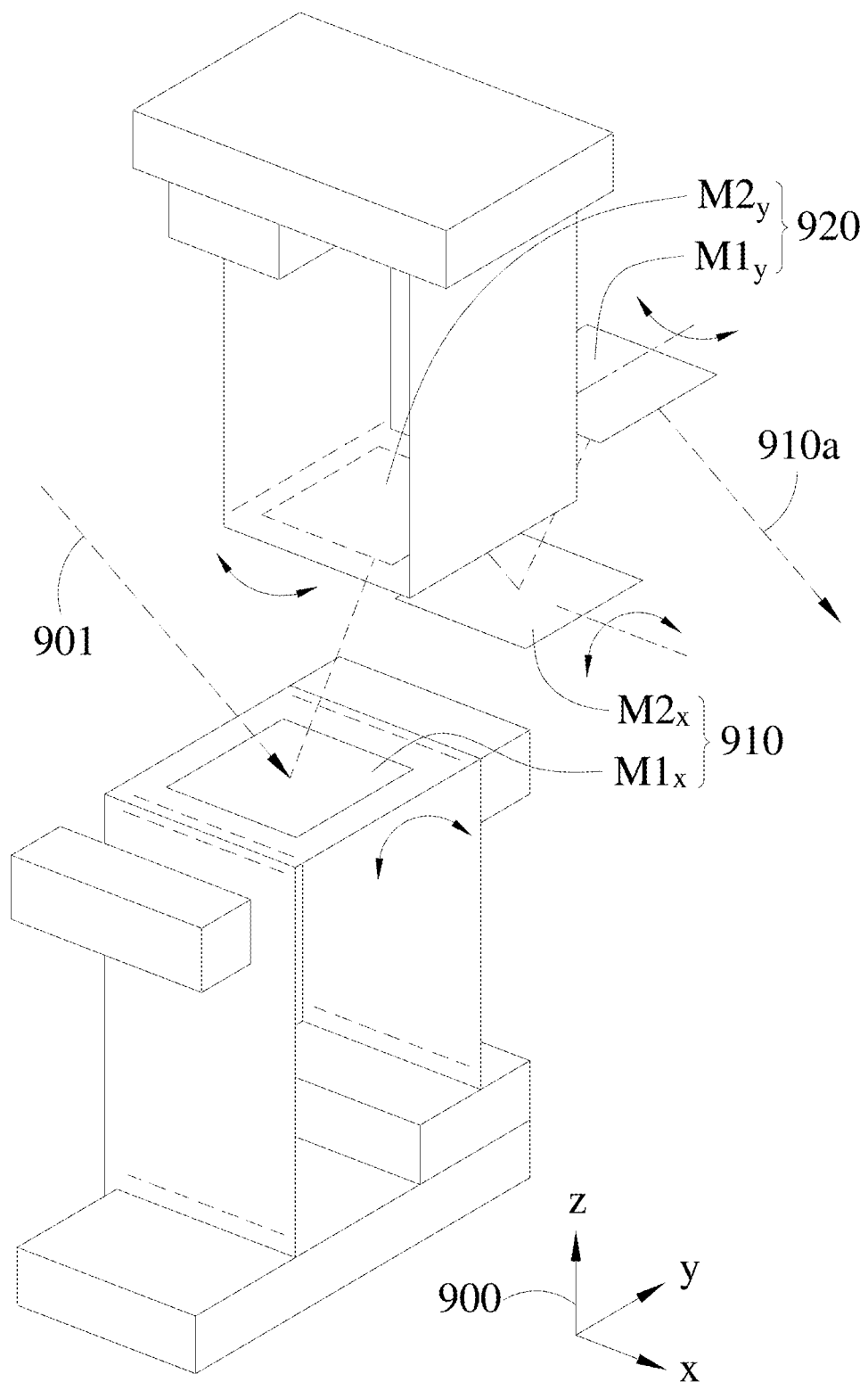
FIG. 11 is a schematic view of two-dimensional scanning operation according to an embodiment of the present invention.

The above-mentioned embodiment of the cascaded mirror array is a one-dimensional scanning system. Two-dimensional scanning system can be achieved by placing reflector units for x-direction scanning on one side of the reflection path and units for y-direction scanning on the opposite side. FIG. 11 is a schematic view of a two-dimensional scanning system according to an embodiment of the present invention. As shown in FIG. 11, a x-y-z three-dimensional reference coordinate system 900 expresses coordinates directions X, Y and Z of the three-dimensional space. After the incident light beam 901 is reflected through the scanning system, the light beam 901a is outputted. The scanning system includes a first mirror array 910 for scanning in Y direction. The deflection axis of each of the reflectors (M1x, M2x) of the first mirror array 910 is parallel to the x-axis of reference coordinate system 900, so the emitting spot of the light beam reflected through the first cascaded mirror array 910 can be used to scan in Y direction. The scanning system includes a second mirror array 920 for scanning in X direction. That is, the deflection axis of each of the reflectors (M1y, M2y) of the second mirror array 920 is parallel to the y-axis of the reference coordinate system, so the emitting spot of the reflected light beam is used to scan in X direction. The two mirror arrays are disposed on two opposite sides of the reflection path, respectively, such as the upper part and lower part of FIG. 11. The reflection path is arranged to alternately pass the reflectors of the two mirror arrays in a sequential order, for example, the order of M1x, M1y, M2x, and M2y shown in FIG. 11. As a result, the reflected light beam 901a can be used to scan in Y and X directions simultaneously so as to achieve the two-dimensional scanning operation.

The ULT mechanism can be further modified to provide more than two discretized positions. One basic approach is to combine multiple 2-position mechanisms that can be controlled independently and then use the combined position/pose variations to generate multiple positions.

Figure 12A:
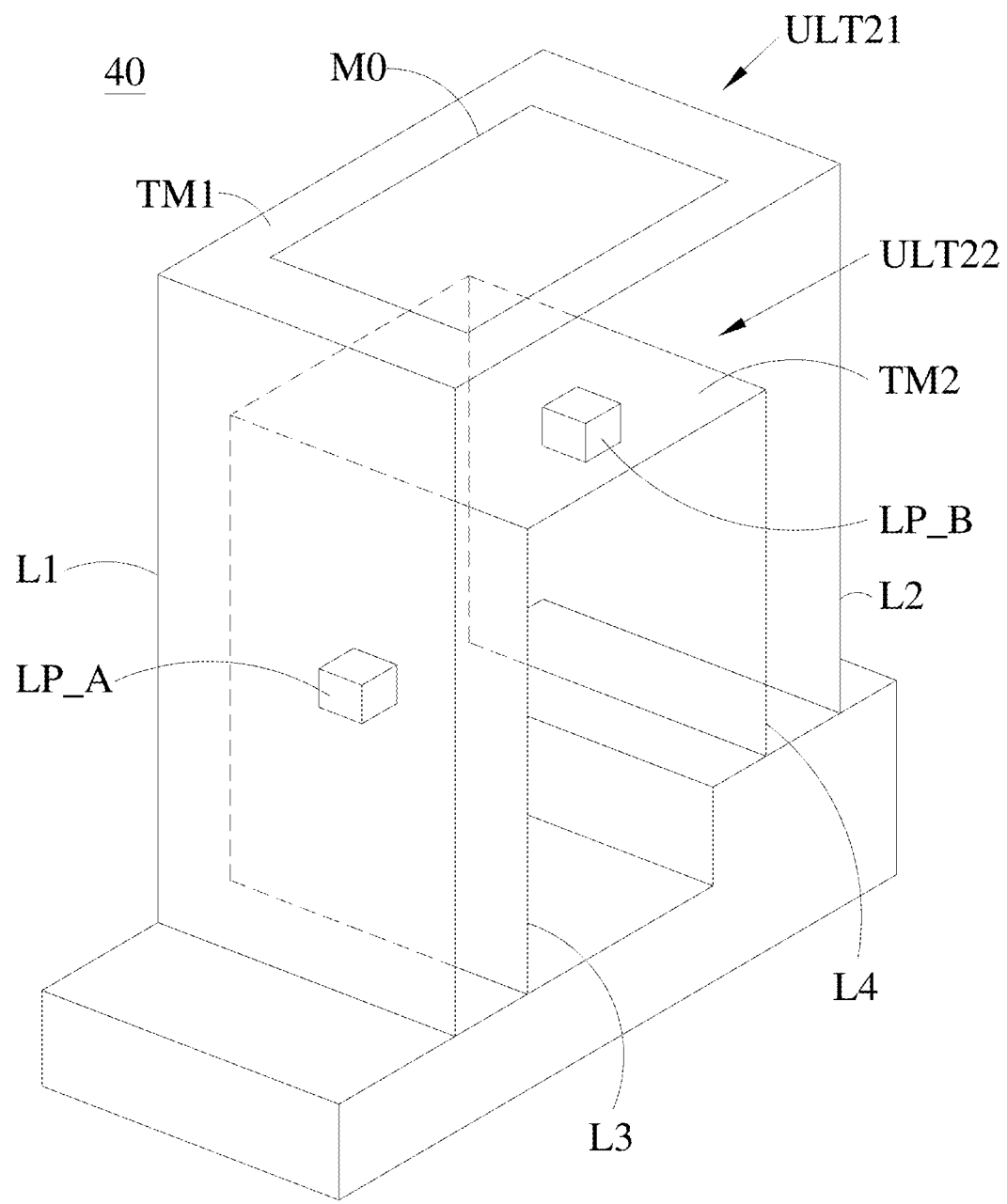
FIGS. 12A and 12B are schematic views of a multi-position ULT mechanism for support structure in a cascaded minor array according to an embodiment of the present invention.
Figure 12B:
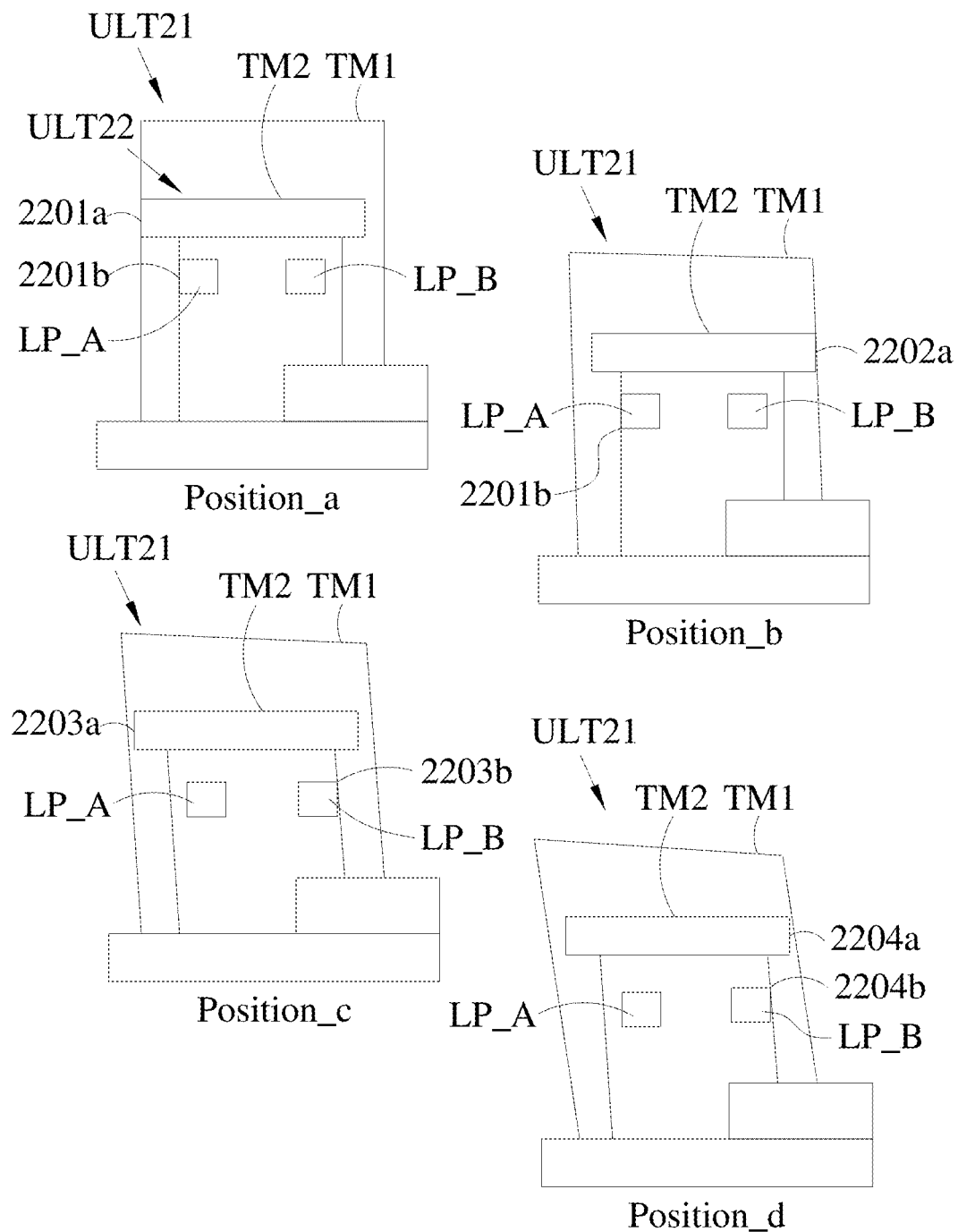

FIG. 12A and FIG. 12B illustrate a first example design of a 4-position mechanism. The design includes 2 ULT mechanisms. The first ULT mechanism (ULT21) is the mechanism that carries the array reflector (M) and functions in similar way as described previously. The second ULT mechanism (ULT22) is positioned under ULT21 in between the two legs of ULT21 and acts as the landing points for ULT21. ULT22 can move between two positions, limited by two landing points further inside the legs of ULT22 (LP_A, LP_B). Thus, ULT22 provides two sets of different landing point positions to ULT21. Using these two sets of landing point positions, ULT21 can move among 4 different positions. For example, in position_a, ULT22 leans toward right against LP_A (at 2201b), while ULT21 also leans toward right against the left edge of top member (TM2) of ULT22 (at 2201a). In position_b, ULT21 leans toward left against the right edge of the top member of ULT22 (at 2202a). In position_c, ULT22 lens toward left (at 2203b) while ULT21 leans toward right against a new position of landing point (2203a). In position_d, both ULT mechanisms lean toward left.

In broad sense, the second ULT mechanism (ULT22) in FIG. 12 does not necessarily have to have legs of uneven lengths. The lengths of legs of the two ULT mechanisms can be determined based on required displacement outputs.

Figure 13A:
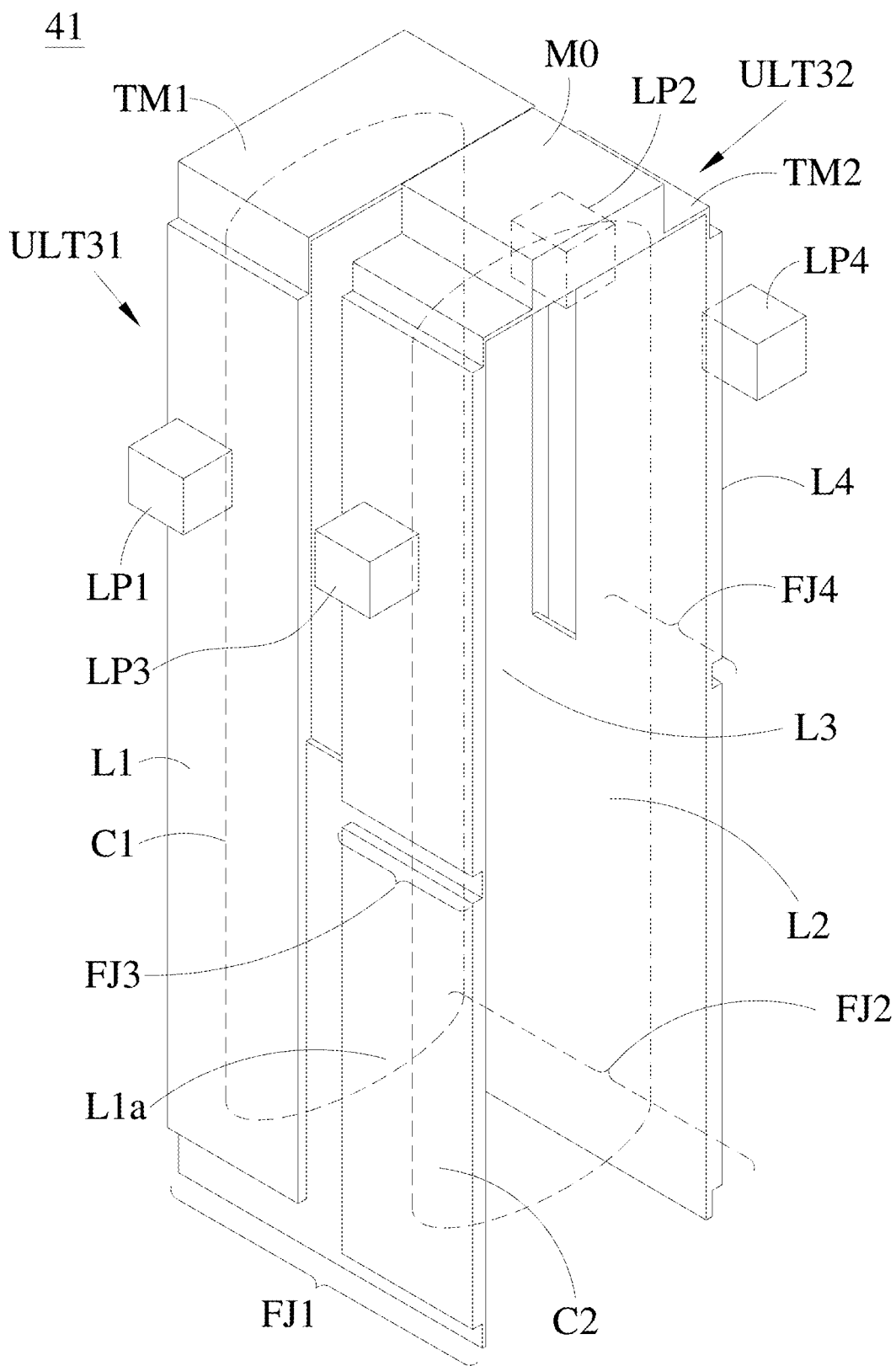
FIGS. 13A and 13B are schematic view of a multi-position ULT mechanism for support structure in a cascaded minor array according to another embodiment of the present invention.
Figure 13B:
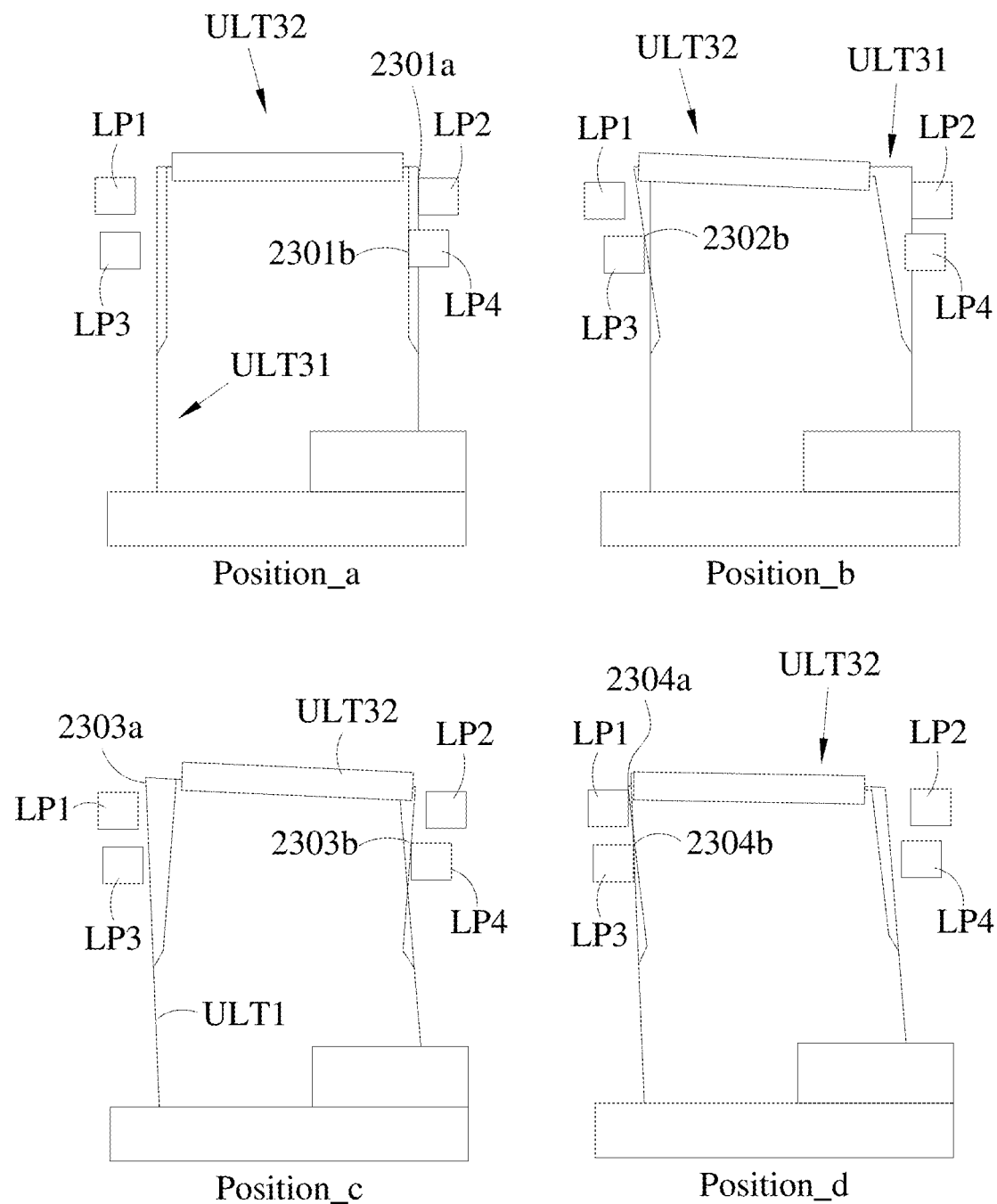

FIG. 13A and FIG. 13B illustrates a second example design of a 4-position mechanism. The design also includes 2 ULT mechanisms with one sitting on the other. The first ULT mechanism (ULT31) has comparatively long legs (L1, L2) including wide lower portions, e.g. the lower portion L1a of leg L1. The legs are rotatable about wide flexural joints FJ1 and FJ2 at their base. Fixed landing points LP1 and LP2 restrict ULT31 at two different positions. On the other hand, the second ULT mechanism (ULT32) has its base located at the middle of the legs of ULT31, on the tops of the wide portions, at flexural joints FJ3 and FJ4. In this case, the base of the second ULT mechanism does not have to be a bar-like member. Two separate base positions for placing the two legs are sufficient. Above the flexural joints FJ3 and FJ4, the legs of ULT32 (L3, L4) are separated from the legs of ULT31 (L1, L2) and can tilt in similar way as a regular ULT mechanism. When ULT32 tilts, its motion is relative to the flexural joints FJ3 and FJ4 on ULT31 and is restricted by another set of two fixed landing points LP3 and LP4. As a result, when ULT31 is at two different positions, landing points LP3 and LP4 will restrict ULT32 at 4 different poses corresponding to 4 different tilting angle of the mirror (M). For example, in position_a, both ULT31 and ULT32 lean toward right at landing points LP2 and LP4 respectively (at 2301a and 2301b). In position_b, ULT32 leans toward left against LP3 at 2302b. In position_c, ULT31 leans toward left while ULT32 leans toward right. In position_d, both ULT31 and ULT32 lean toward left.

To facilitate independent control of the two ULT mechanisms, the conductor loops in the two ULT mechanisms need to be separated. Conductor loops in the ULT mechanisms and magnets arrangement are basically same as previously mentioned embodiments. For the second example design, as shown in FIG. 13A and FIG. 13B, conductor loop C1 for ULT31 and conductor loop C2 for ULT32 are electrically separated and can be controlled independently. Although loop C2 also passes the lower portions of the legs of ULT31, but these parts are shorter than loop C1. Therefore the control of ULT31 is still dominated by conductor loop C.

The advantage of applying 4-position reflector units in a CMA scanning system is that for a required scanning resolution fewer reflector units will be needed. For example, to have a 1D CMA scanner of 1024 scanning spots, 10 array reflectors ($2^{10}$=1024) are needed if using 2-position reflector units. If using 4-position reflector units, then only 5 units ($4^5$=1024) are needed. This also reduce total system size of the CMA scanner.

The present invention disclosed herein has been described by means of specific embodiments. However, numerous modifications, variations and enhancements can be made thereto by those skilled in the art without departing from the spirit and scope of the disclosure set forth in the claims.

For example, although the embodiments of 1D CMA systems described above use a relay mirror at the opposing side of the array reflectors, the array reflectors can also be distributed and placed on two sides of the beam path and the relay mirror can be removed. In fact, the array reflectors do not even need to be distributed in a linear layout. The 1D reflector array can be distributed with turns, much like a polygon shape. These all help to reduce overall size or form factor.

For another example, the preferred embodiments of the ULT mechanism use flexural joints or legs to form an integral structure, to avoid relative movement between disjointed parts and poor repeatability, and the legs and members are of slab shape, for structure stability. However, the ULT mechanism can also be constructed using disjointed parts as long as good joints or bearing are applied.

For another example, the CMA scanning system can not only be applied to scan an outputting light beam or laser beam, it can also be applied to scan inputting light rays from a narrow field of view at different angles in imaging applications. Therefore, in the broadest sense, the meaning of the light beam includes light rays in a scenario of imaging application as well. A light sensor behind a CMA scanner can collect color or light intensity data coming from different distant spots at different angles relative to the CMA scanner. These color or intensity data can then be combined with the angular data to reconstruct a 1D or 2D image at a distance.

What is claimed is:

1. A cascaded mirror array scanner system for scanning a light beam, the system comprising:
   a plurality of reflector units, each of the reflector units comprising:
      an array reflector;
      a support structure supporting the array reflector while allowing the array reflector to move and change angular position;
      a position limiting structure that limits the movement of the array reflector so that the array reflector is positioned at a finite number of predetermined angular positions; and
      a control and driving device electrically connected to the plurality of the reflector units for driving the movement of each of the reflector units respectively,
   wherein the control and driving device causes the movement of each of the array reflectors but does not conduct precision control of the angle of the array reflector electrically while the position limiting structure and the support structure in each of the reflector units restrict the movement and mechanically digitize the angular position of the corresponding array reflector to the finite number of predetermined angular positions, and
   wherein the light beam is directed to pass by and be reflected by each of the array reflectors in a sequential order and thereby is deflected by an overall scan angle equal to a combination of deflection angles at all of the array reflectors.

2. The system of claim 1, wherein the light beam travels on a scan plane and all the predetermined angular position changes of the array reflectors are also on the scan plane, thereby enabling the cascaded mirror array system to scan the light beam on the scan plane.

3. The system of claim 2, wherein:
   the finite number of the predetermined angular positions of each of the array reflectors is two;
   values of finite rotational angle corresponding to the predetermined angular positions of different said array reflectors are arranged as a geometric progression with a common ratio of two; and
   thereby values of the overall scan angle of the light beam constitute an arithmetic progression.

4. The system of claim 1, wherein the support structure comprises a simple lever mechanism.

5. The system of claim 1, wherein the support structure comprises a first uneven-leg tilting mechanism for small angular position changes, the uneven-leg tilting mechanism comprising:
   a base;
   a first leg having an end jointed to one end of the base;
   a second leg having an end jointed to the other end of the base, the second leg and the first leg having a predetermined difference in length; and
   a top member having two ends jointed to the other end of the first leg and the other end of the second leg respectively;
   the array reflector being disposed on the top member, thereby tilting the legs with respect to the base member resulting in small angular position changes of the top member and the array reflector.

6. The system of claim 5, wherein the position limiting structure for the first uneven-leg tilting mechanism comprises
   a second uneven-leg tilting mechanism positioned between the two legs of the first uneven-leg tilting mechanism, top member of the second uneven-leg tilting mechanism acting as a first set of two landing points for position limiting purpose;
   a second set of two landing points for limiting tilting positions of the second uneven-leg tilting mechanism;
   independent tilting of the first and the second uneven-leg tilting mechanisms combined with the restrictions by the two sets of landing points providing four predetermined angular positions of the top member of the first uneven-leg tilting mechanism.

7. The system of claim 5, wherein the position limiting structure for the first uneven-leg tilting mechanism comprises:
   a second uneven-leg tilting mechanism comprising two base positions at the middle of it two legs respectively, the first uneven-leg tilting mechanism being disposed onto the second uneven-leg tilting mechanism using the base positions as its base;
   a first set of two landing points for limiting tilting positions of the first uneven-leg tilting mechanism;
   a second set of two landing points for limiting tilting positions of the second uneven-leg tilting mechanism;
   independent tilting of the first and the second uneven-leg tilting mechanisms combined with the restrictions by the two sets of landing points providing four predetermined angular positions of the top member of the first uneven-leg tilting mechanism.

8. The system of claim 5, wherein
   the first leg, the second leg and the top member of the uneven-leg tilting mechanism comprises a conductor loop for passing switching current for titling switching purpose;
   the control and driving device includes magnets positioned closed to the two legs to provide magnetic fields with directions matching the directions of the switching current.

9. The system of claim 1, wherein the position limiting structure comprises a position calibration mechanism, the position calibration mechanism comprising a first eccentric rod calibration mechanism and a combination of a second eccentric rod calibration mechanism with an uneven-leg tilting mechanism.

10. The system of claim 1, wherein all the finite number of the predetermined angular position changes of the array reflectors are on a first scan plane for deflecting the light beam by a scan angle on the first scan plane;
   wherein the cascaded mirror array system further comprises an additional set of plurality of reflector units, each of the additional reflector units comprising an array reflector movable between a finite number of predetermined angular positions oriented to deflect the light beam off the first scan plane;
   wherein the light beam is directed to pass by and be reflected by each the array reflector in the two sets of plurality of reflector units in a sequential but alternating order, thereby enabling the cascaded mirror array system to perform 2D scan.

11. A reflector steering and scanning system comprising a first uneven-leg tilting mechanism for generating small angular changes of the reflector, the uneven-leg tilting mechanism comprises

- a base;
- a first leg having an end jointed to one end of the base;
- a second leg having an end jointed to the other end of the base, the second leg and the first leg having a predetermined difference in length; and
- a top member having two ends jointed to the other end of the first leg and the other end of the second leg respectively;
- the reflector being disposed on the top member, thereby tilting the legs with respect to the base member resulting in small angular position changes of the top member and the reflector.

12. The system of claim 11, wherein the first leg, the second leg and the top member of the uneven-leg tilting mechanism comprises a conductor loop for passing switching current for titling switching purpose; and further comprising magnets positioned closed to the two legs to provide magnetic fields with directions matching the directions of the switching current.

\* \* \* \* \*